(12) United States Patent
Driesen et al.

(10) Patent No.: US 11,962,146 B2
(45) Date of Patent: Apr. 16, 2024

(54) SYSTEM AND METHOD FOR CONTROLLING THE VOLTAGE OF BIPOLAR DC POWER SYSTEMS

(71) Applicant: KATHOLIEKE UNIVERSITEIT LEUVEN, Leuven (BE)

(72) Inventors: Johan Driesen, Heverlee (BE); Giel Van Den Broeck, Aarschot (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 304 days.

(21) Appl. No.: 17/436,815

(22) PCT Filed: Mar. 4, 2020

(86) PCT No.: PCT/EP2020/055677
§ 371 (c)(1),
(2) Date: Sep. 7, 2021

(87) PCT Pub. No.: WO2020/178328
PCT Pub. Date: Sep. 10, 2020

(65) Prior Publication Data
US 2022/0173590 A1    Jun. 2, 2022

(30) Foreign Application Priority Data

Mar. 4, 2019 (EP) .................................... 19160601
Aug. 6, 2019 (GB) .................................... 1911232

(51) Int. Cl.
*H02J 1/08* (2006.01)
*H02M 3/158* (2006.01)

(52) U.S. Cl.
CPC .............. *H02J 1/082* (2020.01); *H02M 3/158* (2013.01)

(58) Field of Classification Search
CPC ........ H02J 1/082; H02M 3/158; H02M 7/483; G05F 1/613
See application file for complete search history.

(56) References Cited

FOREIGN PATENT DOCUMENTS

| CN | 106452133 A | 2/2017 |
|---|---|---|
| KR | 20150088404 A | 8/2015 |
| KR | 20160075999 A | 6/2016 |

OTHER PUBLICATIONS

International Search Report and Written Opinion from PCT Application No. PCT/EP2020/055677, dated Apr. 8, 2020.
Extended Search Report from corresponding EP Application No. EP19160601.1, dated Apr. 16, 2019.

(Continued)

*Primary Examiner* — Jung Kim
(74) *Attorney, Agent, or Firm* — Workman Nydegger

(57) ABSTRACT

A system for controlling a bipolar DC power includes a positive conductor, a neutral conductor and negative conductor. A positive pole-to-neutral voltage is a voltage between the positive conductor and the neutral conductor and a negative pole-to-neutral voltage is a voltage between the negative conductor and the neutral conductor. The system comprises control means for controlling the positive pole-to-neutral voltage and the negative pole-to-neutral voltage. The control means includes a first voltage converter configured to control a sum or difference of the positive pole-to-neutral voltage and the negative pole-to-neutral voltage, respectively as a function of the sum or difference of the positive output current and negative output current, and a second voltage converter.

12 Claims, 22 Drawing Sheets

(56) References Cited

OTHER PUBLICATIONS

Lago et al., "Evaluation of Power Converters to Implement Bipolar DC Active Distribution Networks—DC-DC Converters," 2011 IEEE Energy Conversion Congress and Exposition, Sep. 17, 2011, pp. 985-990.
Wang et al., "Topology Deduction and Analysis of Voltage Balancers for DC Microgrid," IEEE Journal of Emerging and Selected Topics in Power Electronics, vol. 5, Issue No. 2, Dec. 13, 2016, pp. 672-680.
Wu et al., "Effective Voltage Balance Control for Bipolar-DC-Bus-Fed EV Charging Station With Three-Level DC-DC Fast Charger," IEEE Transactions on Industrial Electronics, vol. 63, Issue No. 7, Jul. 31, 2016, pp. 4031-4041.
Han et al., "Non-Isolated Three-Port DC/DC Converter for ±380V DC Microgrids," PCIM Europe, International Exhibition and Conference for Power Electronics, Intelligent Motion, Renewable Energy and Energy Management, May 10-12, 2016, pp. 469-476.
Li et al., "A Genetic Algorithm based Calibration Approach on Validating Cascading Failure Analysis," 2017 IEEE Power & Energy Society General Meeting, Chicago IL, Jul. 16-20, 2017, 5 pages.

SYSTEM AND METHOD FOR CONTROLLING THE VOLTAGE OF BIPOLAR DC POWER SYSTEMS

FIELD OF THE INVENTION

The present invention relates to field of electric powering. More particularly, the present invention relates to devices for controlling bipolar DC power systems and methods of controlling bipolar DC power systems.

BACKGROUND OF THE INVENTION

DC power systems offer improved compatibility between loads, generators and storage systems internally operating at DC or requiring DC along the power conversion chain from generation to consumption. Examples of DC generators, loads and storage systems include solar photovoltaic systems, electric vehicles, fuel cells, variable-frequency drives, battery energy storage systems, LED lighting fixtures, etc. Improved compatibility enables to eliminate or simplify AC/DC and DC/DC power conversion steps between the devices that are interconnected, offering a number of related advantages. It increases the energy efficiency of the power system, the system's dependability and ultimately lowers the costs.

Therefore, DC power systems are favored over traditional AC power system architectures in a number of applications, for example in datacenters, building-level nanogrids and district-level microgrids for interconnecting electric vehicle charging infrastructure and high-power devices (heating, ventilation, air-conditioning and elevator drives), industrial manufacturing facilities to facilitate the integration of on-site storage and improve the power quality, electric vehicle charging stations, street lighting poles, cellular network masts, traffic signalization, and on-board applications, including aircraft and shipboard electrical power systems.

The majority of current DC power systems adopt a two-wire, unipolar DC architecture comprising a positive and negative pole. However, to transfer more power per unit conductor cross-section and to cover larger distances, the bipolar, three-wire DC architecture can be used. Considered voltage levels are for example +/−380V (positive pole: 380V, neutral: 0V, negative pole: −380V), +/−190V and +/−350V. The bipolar DC architecture provides two voltage levels, namely the positive-to-negative pole-to-pole voltage (e.g. 760V) and the pole-to-neutral voltage (e.g. 380V), for connecting devices at the most suitable voltage level. However, continuously stabilizing two voltage levels in bipolar DC power systems renders voltage control more complex than in unipolar systems, especially with the presence of devices connected alternately between the positive pole and the neutral and the negative pole and the neutral. If the current in the positive pole conductor differs from the current in the negative pole conductor, the neutral conductor can carry current, leading to a difference in the positive and negative pole-to-neutral voltages. Eventually, this difference may cause over- and undervoltage in the system, threatening the system's dependability.

Thus, bipolar DC power systems require active control of the DC pole-to-neutral voltages measured between the positive pole and the neutral conductor and the negative pole and the neutral conductor. Even in the presence of unbalanced loading conditions, in which case the power off-take and infeed on the positive pole and the negative pole differs, the pole-to-neutral voltage levels need to remain stable.

Stacking of two AC-DC or DC-DC converters that separately control the positive pole-to-neutral voltage and the negative pole-to-neutral voltage has been described in Korean patent application KR20160075999. This system relies upon its main control unit for voltage control. Alternatively, in KR20150088404, an AC-DC converter connected to the positive and the negative conductor of the bipolar DC system has been disclosed which allows regulation of the positive-to-negative pole-to-pole voltage, and a voltage balancer is introduced for controlling the neutral terminal voltage. The voltage balancer is a voltage converter that transfers power from the positive pole to the negative pole in order to equalize the pole-to-neutral voltages. The system will fail if the voltage balancer or bidirectional converter fail. Several voltage balancer topologies exist. Examples are described by Lago et al. in Energy Conversion Congress and Exposition (2011), pp 985-990, in Korean patent application KR20150088404 and in Wang et al. in IEEE J. Emerg. Sel. Top. Power Electron vol. 5 (2017) 2, pp 672-680. Another alternative is a three-port DC-DC converter with a positive, neutral and a negative output terminal for interfacing with bipolar DC systems and controlling the positive and negative pole-to-neutral voltages. Both isolated DC-DC converters, as described in Chinese patent application CN106452133, and non-isolated DC-DC converters, as described in Wu et al. in IEEE Trans. Ind. Electron. 63 (2016) 7, pp 4031-4041 and in Han et al. in PCIM Europe (2016) pp 469-476, have that capability.

In three-wire bipolar DC systems, two-terminal AC-DC and DC-DC voltage converters connected to the positive pole and the neutral can be equipped with droop control, as well as voltage converters connected to the negative pole and the neutral. In that case, the bipolar DC system is controlled as two unipolar subsystems. Another method allows parallelizing multiple two-level half-bridge voltage balancers by a variant of the voltage droop control method for unipolar DC systems, as described in Li et al. in IEEE Power & Energy Society General Meeting (2017) p 5. That method controls the voltage difference between the positive pole-to-neutral voltage and the negative pole-to-neutral voltage and the voltage difference setpoint reduces in proportion to the current injected in the neutral terminal.

However, bipolar DC systems require decentralized controllers and a voltage control method for parallelizing multiple aforementioned AC-DC and DC-DC, two-port and three-port voltage converters with the ability to regulate the pole-to-pole and pole-to-neutral voltages. Such controllers and control method would increase the system dependability and enable to modularly scale-up to higher power levels. Such controllers and control methods are not currently available.

SUMMARY OF THE INVENTION

It is an object to provide good systems for controlling single bipolar DC systems, electric appliances comprising such control systems and good methods for controlling single bipolar D systems.

Embodiments of the present invention provide a system with multiple voltage converters to control a single bipolar DC system, such that there is redundancy and the system does not encounter a single point of failure. Scalability is also enabled, as by combining multiple voltage converters in a modular manner, the total power level increases proportionally.

However, parallelizing multiple voltage converters in a bipolar DC power system requires a voltage control system, which ensures that the magnitudes of the positive pole-to-neutral voltage, measured between the positive conductor and the neutral conductor, and the negative pole-to-neutral voltage, measured between the neutral conductor and the negative conductor, remain within acceptable operating limits, but avoids counteraction between voltage converters. Therefore, the voltage control system according to embodiments of the present invention allows coordinating the setpoints sent to all voltage converters. These voltage setpoints eventually allow determining how much power each voltage converter contributes to control the pole-to-neutral voltages. Suitable selection of the voltage setpoints avoids undesired interactions between the voltage converters.

More in particular embodiments of the invention disclose a system for controlling a bipolar DC power system, wherein the bipolar DC power system comprises a positive conductor, a neutral conductor and negative conductor, wherein a positive pole-to-neutral voltage is a voltage between the positive conductor and the neutral conductor and a negative pole-to-neutral voltage is a voltage between the negative conductor and the neutral conductor. The system comprises control means for controlling the positive pole-to-neutral voltage and the negative pole-to-neutral voltage, the control means comprising a first voltage converter configured to control a sum or difference of the positive pole-to-neutral voltage and the negative pole-to-neutral voltage; and a second voltage converter, wherein, if the first voltage converter is configured to control the sum of the positive pole-to-neutral voltage and the negative pole-to-neutral voltage, then the second voltage converter is configured to control the positive pole-to-neutral voltage, the negative pole-to-neutral voltage, or the difference of the positive pole-to-neutral voltage and the negative pole-to-neutral voltage, and wherein if the first voltage converter is configured to control the difference of the positive pole-to-neutral voltage and the negative pole-to-neutral voltage, then the second voltage converter is configured to control the positive pole-to-neutral voltage, the negative pole-to-neutral voltage, or the sum of the positive pole-to-neutral voltage and the negative pole-to-neutral voltage, wherein controlling a voltage comprises controlling the voltage as a function of the respective output current or power. One or more of the voltage converters of the control means may be configured for controlling the positive pole-to-neutral voltage and the negative pole-to-neutral voltage.

The control means may be a controller.

In one aspect, the present invention also relates to a method of controlling a voltage in a bipolar DC power system comprising a positive conductor, a neutral conductor and negative conductor, wherein a positive pole-to-neutral voltage is a voltage between the positive conductor and the neutral conductor and a negative pole-to-neutral voltage is a voltage between the negative conductor and the neutral conductor, using a system for controlling the bipolar DC power system, whereby the system for controlling comprises a first voltage converter configured to control a sum or difference of the positive pole-to-neutral voltage and the negative pole-to-neutral voltage; and a second voltage converter, wherein, if the first voltage converter is configured to control the sum of the positive pole-to-neutral voltage and the negative pole-to-neutral voltage, then the second voltage converter is configured to control the positive pole-to-neutral voltage, the negative pole-to-neutral voltage, or the difference of the positive pole-to-neutral voltage and the negative pole-to-neutral voltage, and wherein if the first voltage converter is configured to control the difference of the positive pole-to-neutral voltage and the negative pole-to-neutral voltage, then the second voltage converter is configured to control the positive pole-to-neutral voltage, the negative pole-to-neutral voltage, or the sum of the positive pole-to-neutral voltage and the negative pole-to-neutral voltage, wherein controlling a voltage comprises controlling the voltage as a function of the respective output current or power. The method comprises receiving a voltage value in the system for controlling, receiving in the system for controlling an output current value, and determining a setpoint voltage in dependence upon the output current or power value.

Particular and preferred aspects of the invention are set out in the accompanying independent and dependent claims. Features from the dependent claims may be combined with features of the independent claims and with features of other dependent claims as appropriate and not merely as explicitly set out in the claims.

BRIEF DESCRIPTION OF THE DRAWINGS

Further features of the present invention will become apparent from the examples and figures, wherein:

FIGS. 19(a) to 19(d), presents experimental results of the bipolar DC experimental set-up of FIG. 18 in balanced and unbalanced operating conditions;

DETAILED DESCRIPTION OF PREFERRED EMBODIMENTS

Figure 1:
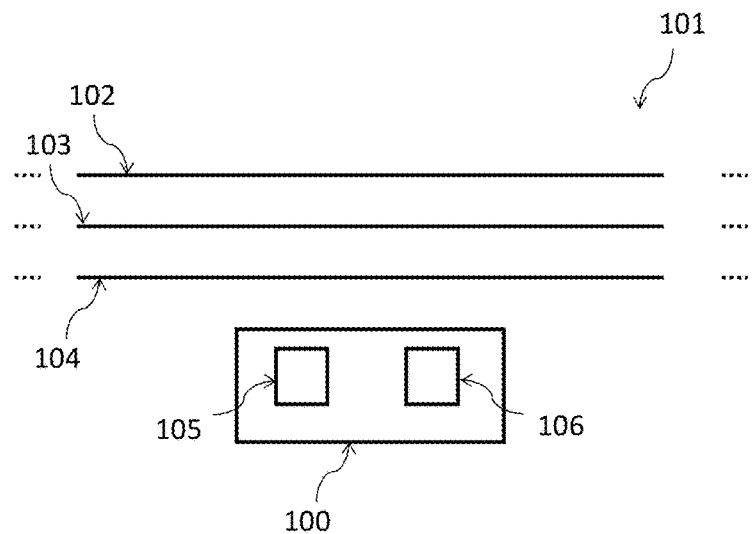
FIG. 1 is a schematic diagram of a system according to embodiments of the present invention and a bipolar DC power system.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated. The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein. In the drawings, like reference numerals indicate like features; and, a reference numeral appearing in more than one figure refers to the same element.

Where in embodiments of the present invention reference is made to a control means, reference also may be made to a controller.

Where in embodiments of the present invention reference is made to a control means for controlling the positive pole-to-neutral voltage and the negative pole-to-neutral voltage, reference may be made to a control means configured for controlling the positive pole-to-neutral voltage and the negative pole-to-neural voltage. Furthermore, in embodiments, reference may be made to one or more of the voltage converters of the control means being configured for controlling the positive pole-to-neutral voltage and the negative pole-to-neutral voltage.

Where in embodiments of the present invention reference is made to a voltage converter, reference also may be made to a voltage source converter.

Referring to FIG. 1, a system 100 for controlling a bipolar DC power system 101 according to embodiments of the present invention is shown. The power system 101 may be a power transmission system or a power distribution system. The bipolar DC system 101 comprises a positive conductor 102, a neutral conductor 103 and a negative conductor 104. A positive pole-to-neutral voltage is a voltage between the positive conductor and the neutral conductor and a negative pole-to-neutral voltage is a voltage between the negative conductor and the neutral conductor.

The system 100 comprises control means for controlling the positive pole-to-neutral voltage and the negative pole-to-neutral voltage, the control means comprising a first voltage converter 105 and a second voltage converter 106 which together can control the pole-to-neutral voltages of the bipolar DC system 101. As used herein, a voltage converter refers to a power electronic converter that has the ability to control either the positive pole-to-neutral voltage, the negative pole-to-neutral voltage or a mathematical function of the negative and positive pole-to-neutral voltages, for example by maintaining the voltages at a setpoint value.

In some embodiments, the first voltage converter 105 and the second voltage converter 106 are located within the same box or enclosure (not shown). In some embodiments, the first voltage converter 105 and the second voltage converter 106 are not located within the same box or enclosure and can be moved independently of each other. For example, the first and second converters may be connectable to a bipolar DC system spanning multiple buildings and the first converter may be connectable to the bipolar DC system in a first building whereas the second converter is connectable to the bipolar DC system in a second, different building. In another embodiment, the first converter may be connectable in the basement of a building and the second converter may be connectable at the rooftop of a building, for example connectable to a photovoltaic installation. The system 100 may comprise one or more further, non-voltage regulating converters (not shown) between the first and second converters, for example for supplying loads or generators. The system may comprise one or more electronic components or mechanical contacts connected in series with the positive, neutral or negative conductor, between the first and second converters as protective devices.

Hereinafter, voltage converters are categorized into four categories:
Balanced voltage converters
Unbalanced voltage converters
Positive voltage converters
Negative voltage converters
The four categories are not mutually exclusive.

Figure 2A:
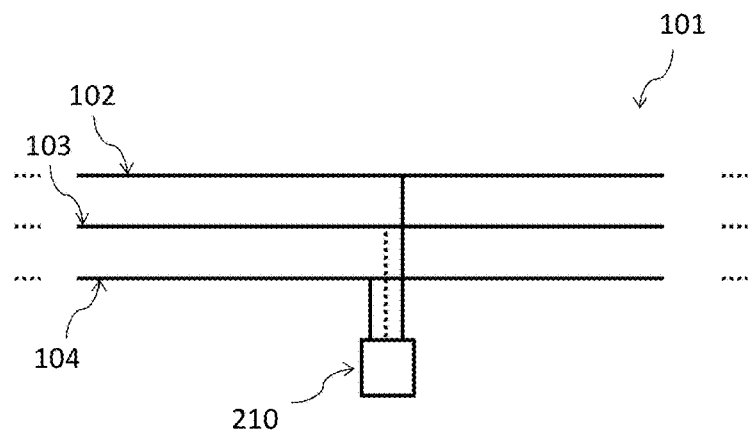
FIG. 2a is a schematic diagram of a balanced voltage converter comprised in embodiments of the present invention and connected to a bipolar DC power system.
Figure 2B:
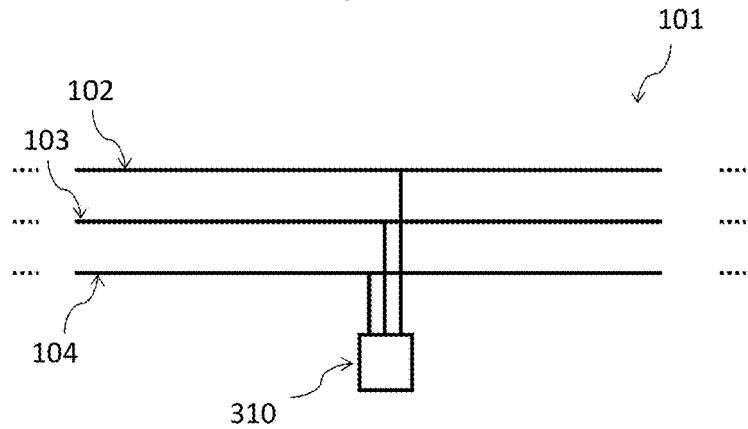
FIG. 2b is a schematic diagram of an unbalanced voltage converter comprised in embodiments of the present invention and connected to a bipolar DC power system.
Figure 2C:
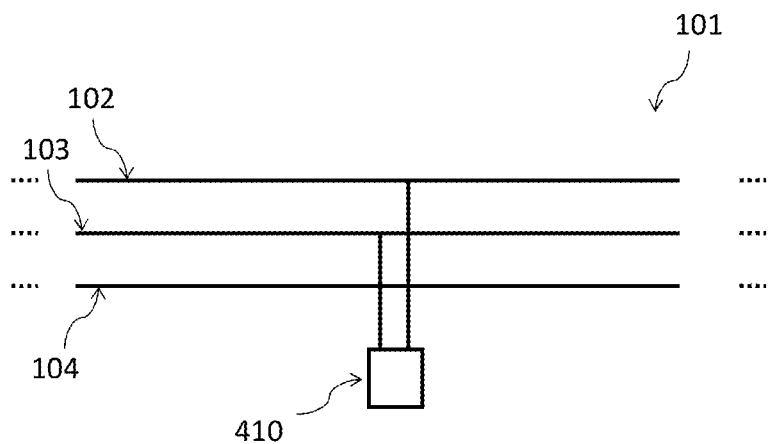
FIG. 2c is a schematic diagram of a positive voltage converter comprised in embodiments of the present invention and connected to a bipolar DC power system.
Figure 2D:
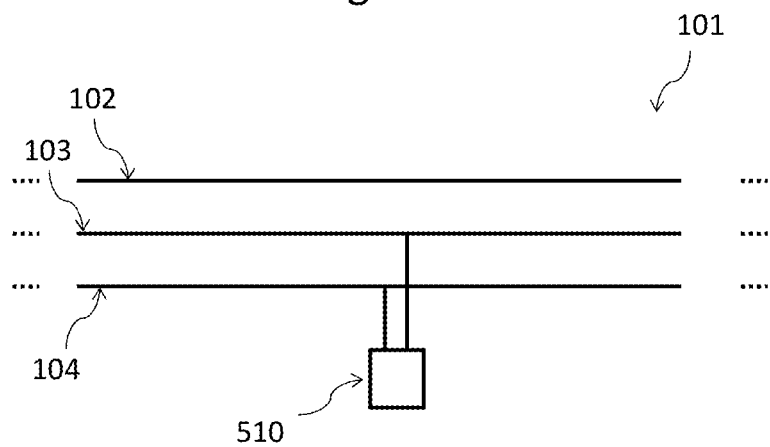
FIG. 2d is a schematic diagram of a negative voltage converter comprised in embodiments of the present invention and connected to a bipolar DC power system.

In a system 100 according to embodiments of the present invention, the first voltage converter 105 is a balanced or an unbalanced voltage converter. If the first voltage converter 105 is a balanced voltage converter, then the second voltage converter 106 is an unbalanced voltage converter, a positive voltage converter, or a negative voltage converter. If the first voltage converter 105 is an unbalanced voltage converter, then the second voltage converter 106 is a balanced voltage converter, a positive voltage converter, or a negative voltage converter The voltage converter types are schematically shown in FIGS. 2a to 2d. Referring to FIG. 2a, a balanced voltage converter 210 comprises two front-end terminals configured to connect to the positive 102 and the negative 104 conductor respectively and an optional front-end terminal configured to connect to the neutral conductor 103. Referring to FIG. 2b, an unbalanced voltage converter 310 comprises three front-end terminals configured to connect to the positive 102, the neutral 103 and negative 104 conductor respectively. Referring to FIG. 2c, a positive voltage converter 410 comprises two front-end terminals configured to connect to the positive 102 and neutral 103 conductor respectively. Referring to FIG. 2d, a negative voltage converter 510 comprises two front-end terminals configured to connect to the neutral 103 and negative 104 conductor respectively.

Each of the voltage converters 210, 310, 410 and 510 comprises a power conversion stage, a control module and two or three DC front-end connection terminals. Optionally, voltage converters are able to interface by means of two or more electrical conductors with input devices 114, 115, 116, 117 such as generators, loads, storage systems, the AC grid, or another DC system from which they receive a voltage to be converted.

Balanced Voltage Converters

Figure 3:
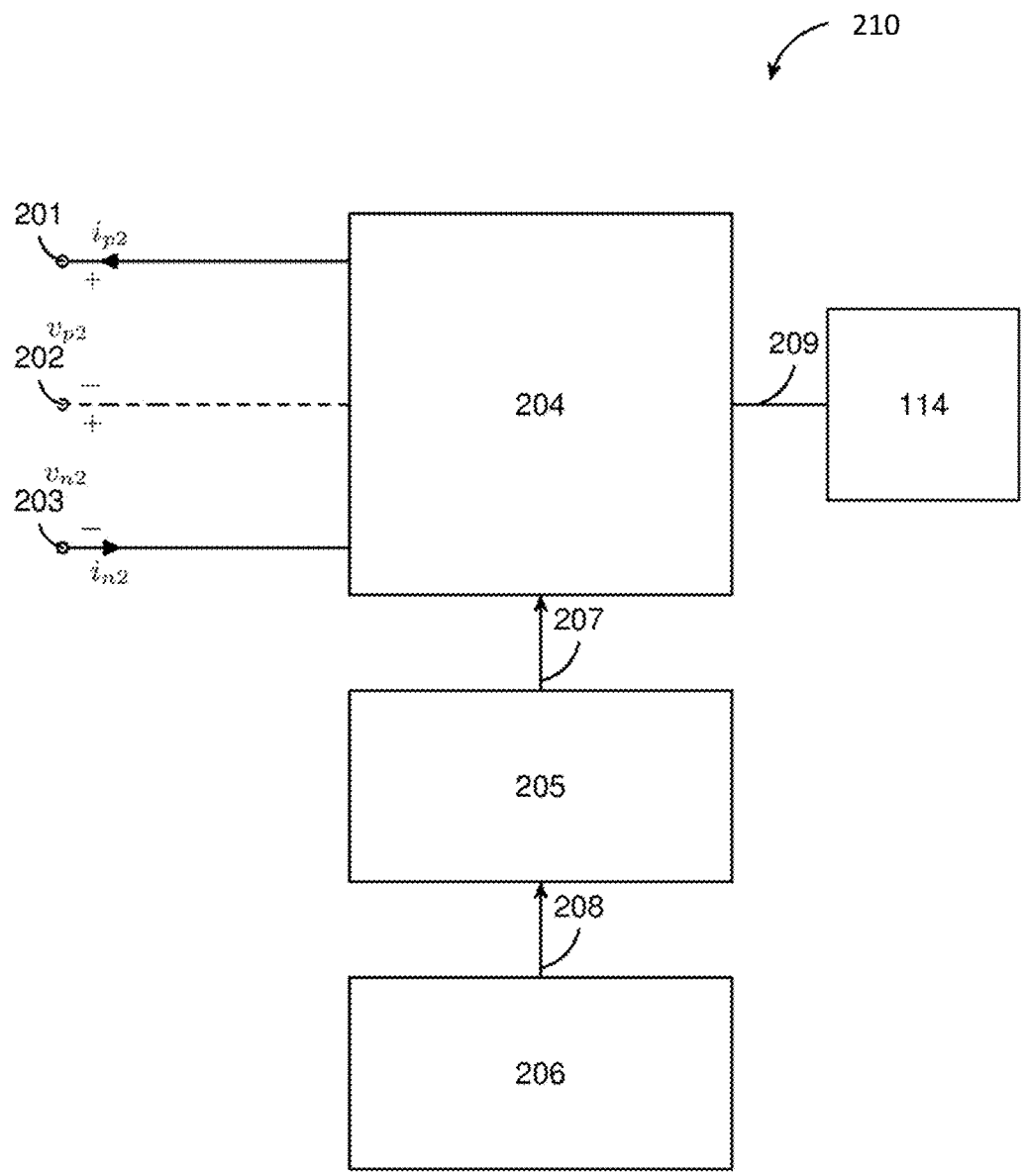
FIG. 3 is a schematic diagram of an internal configuration of a balanced voltage converter comprised in embodiments of the present invention.

Referring to FIG. 3, a balanced voltage converter 210 comprises a positive terminal 201 and a negative terminal 203, an optional neutral terminal 202, a processor 206, a control module 205, and a power conversion stage 204. The balanced converter 210 is configured to interface with an input device 114 by means of two or more electrical conductors 209. The positive terminal 201, the optional neutral terminal 202 and the negative terminal 203 are referred to as the front-end of the balanced voltage converter. A balanced voltage converter is connectable via the positive 201 and negative 203 terminal to the positive 102 and negative 104 conductor of a bipolar DC system respectively. If provided, the neutral terminal 202 is connectable to the neutral conductor 103 of a bipolar DC system. The power conversion stage 204 contains power semiconductor devices, gate drive circuits and input and output filters for DC/AC or DC/DC conversion. The input device 114 can be an AC grid, another DC grid, an AC end-use device or a DC end-use device. The input device 114 is connectable to the power conversion stage 204 via two or more electrical conductors 209.

The power conversion stage 204 is configured to transfer power from the input device 114 to the front-end of the balanced voltage converter. The direction of power transfer can be bidirectional.

Figure 4A:
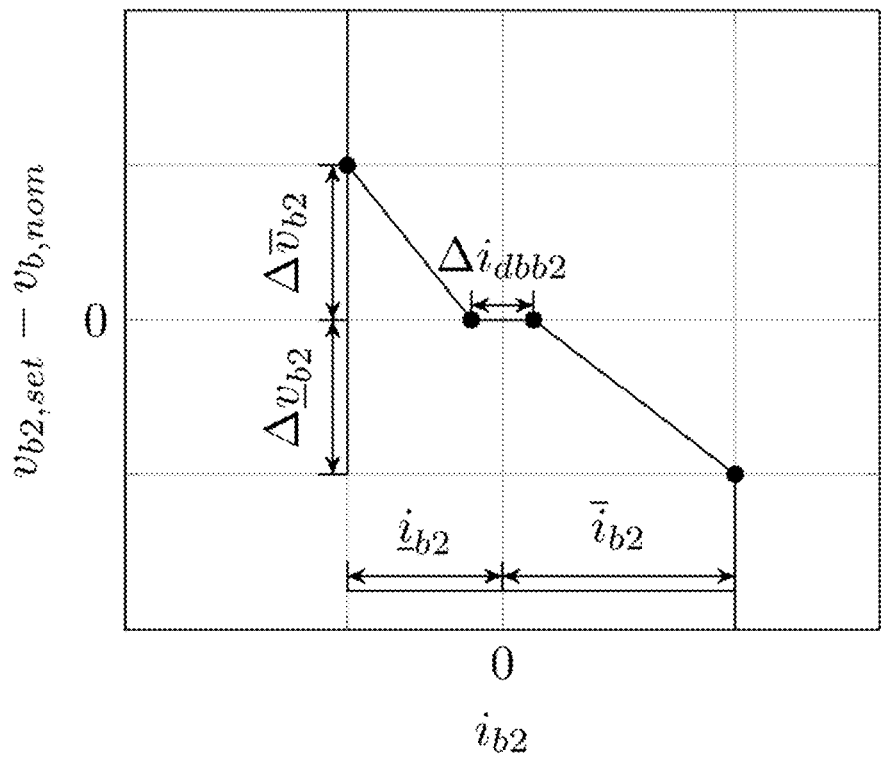
FIGS. 4a to 4c are plots of example relationships between a balanced voltage setpoint $v_{b2,set}$ relative to the nominal balanced voltage $v_{b,nom}$ of a balanced voltage converter and the output balanced current $i_{b2}$.
Figure 4B:
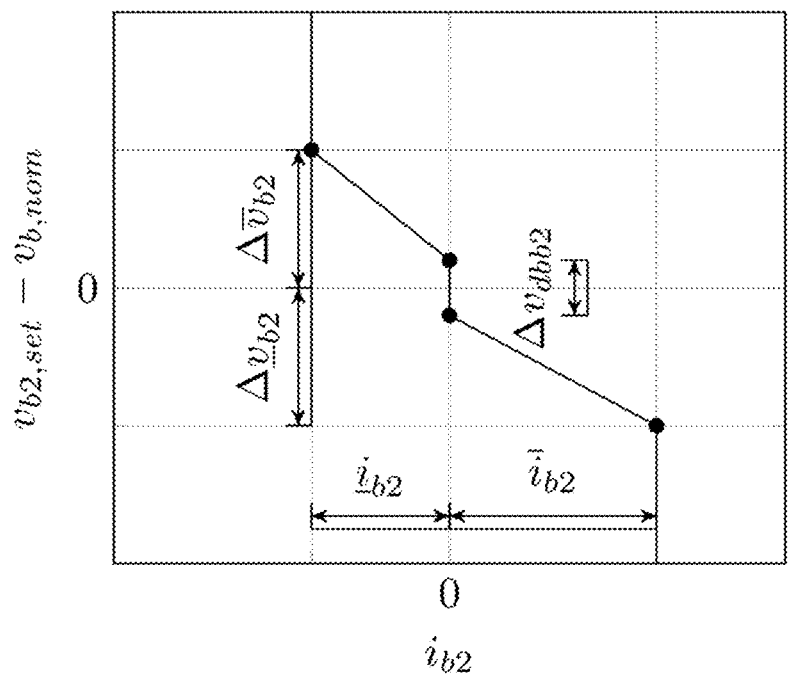
Figure 4C:
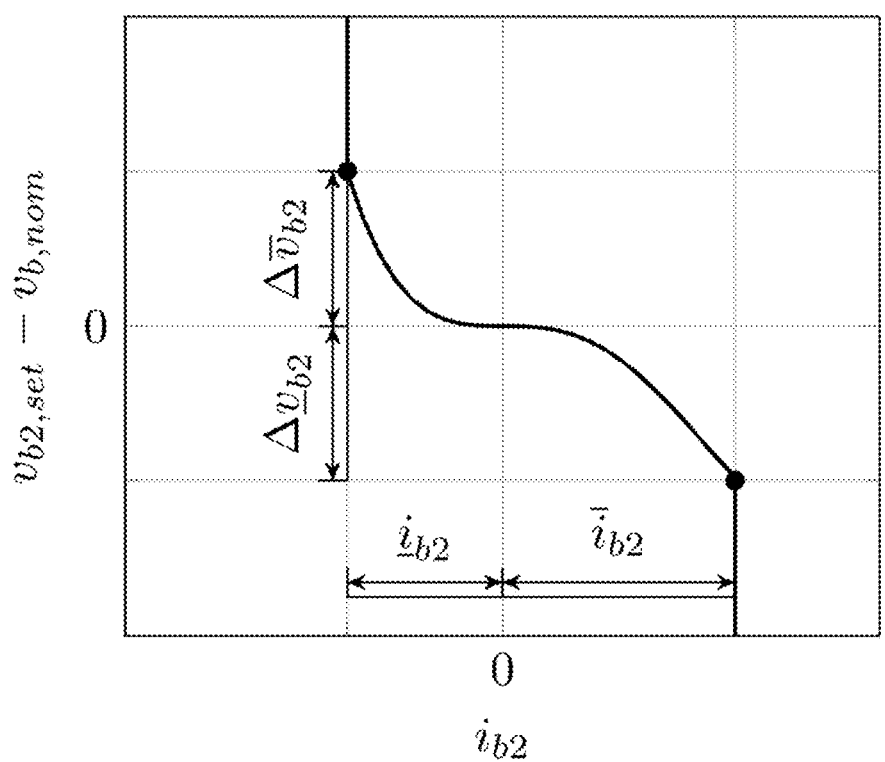

The processor 206 is configured to determine a balanced voltage signal $v_{b2}=(v_{p2}+v_{n2})/2$ (with $v_{p2}$ and $v_{n2}$ the positive and the negative pole-to-neutral voltage, respectively—see FIG. 3), a balanced current signal $i_{b2}=(i_{p2}+i_{n2})/2$ and a balanced voltage setpoint signal $v_{b2,set}$, which is a function of the balanced current signal $i_{b2}$. Voltage signal $v_{b2}$ is thus related to the sum of $v_{p2}$ and $v_{n2}$. For example, FIGS. 4a to 4c depict example functional relationships between the balanced voltage setpoint signal $v_{b2,set}$, determined by the processor, and the balanced current $i_{b2}$. The functional relationships are based on some or all of the following parameters: the nominal balanced voltage $v_{b,nom}$, the maximum balanced voltage deviation $\Delta \overline{v}_{b2}$, the minimum balanced voltage deviation $\Delta \underline{v}_{b2}$, the balanced current deadband $\Delta i_{dbb2}$, the balanced voltage deadband $\Delta v_{dbb2}$, the maximum balanced current $\overline{I}_{b2}$ and the minimum balanced current $\underline{i}_{b2}$. The maximum and minimum balanced voltage deviation are determined from the voltage tolerances defined for the bipolar DC system. The maximum and minimum balanced current is determined by the current limits of the balanced voltage converter. The balanced current deadband may vary between zero and $\overline{I}_{b2}+\underline{i}_{b2}$. The balanced voltage deadband can vary between zero and $\overline{v}_{b2}+\underline{v}_{b2}$. The voltage-current relationship is preferably monotonically decreasing, for example described by a piecewise linear function or a polynomial. In the preceding description, balanced power can be used instead of balanced current equivalently, in which case the balanced power $p_{b2}$ is defined as $p_{b2}=(v_{p2}i_{p2}+v_{n2}i_{n2})/2$.

The control module 205 is configured to receive the balanced voltage setpoint signal $v_{b2,set}$ 208 and to send pulse-width modulation signals 207 to the power conversion stage 204, such that the balanced voltage signal $v_{b2}$ tracks the balanced voltage setpoint signal $v_{b2,set}$. The processor 206 and the control module 205 can be embedded in a single computational unit (not shown).

Unbalanced Voltage Converters

Figure 5:
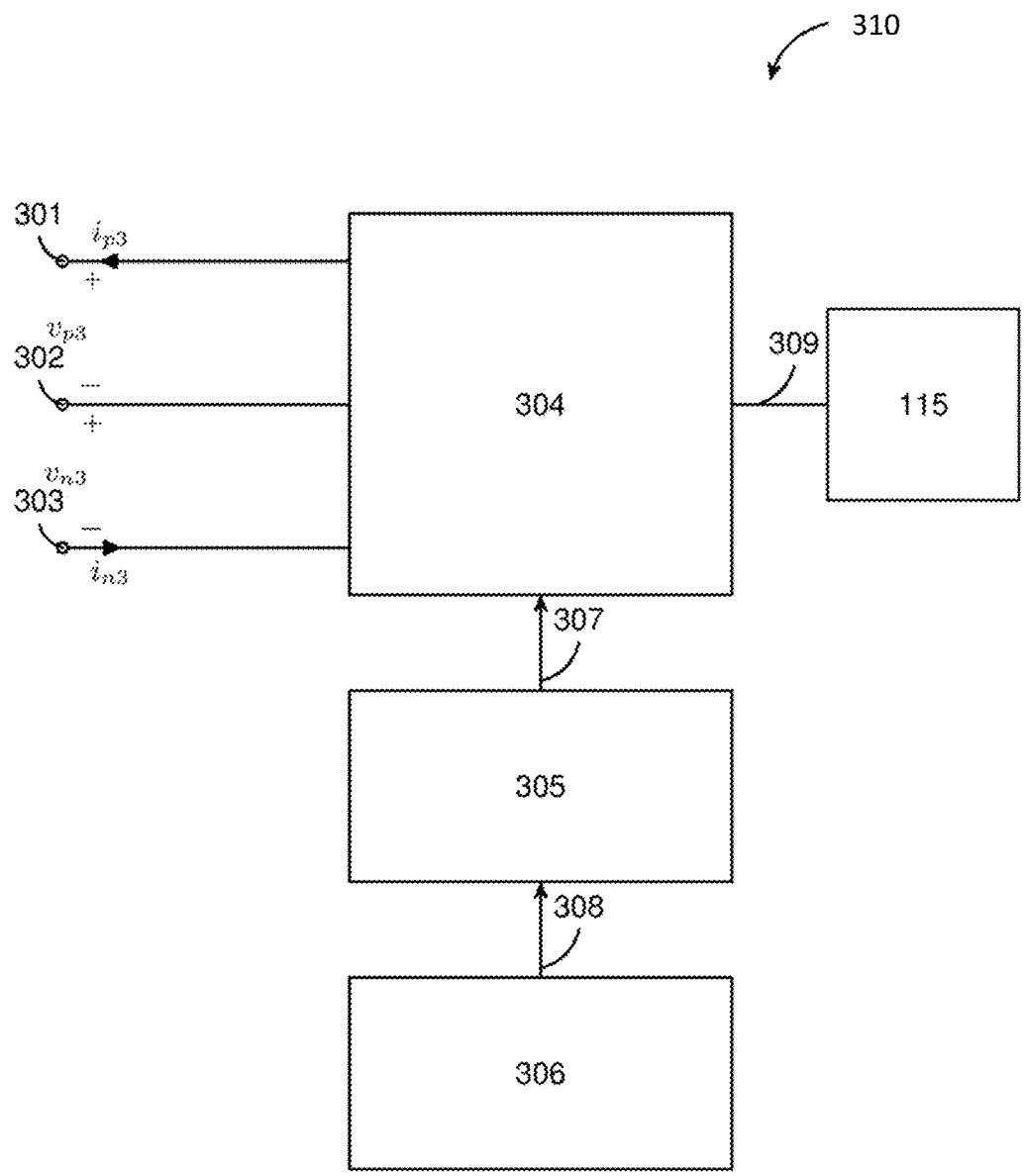
FIG. 5 is a schematic diagram of an internal configuration of an unbalanced voltage converter comprised in embodiments of the present invention.

Referring to FIG. 5, an unbalanced voltage converter 310 comprises a positive terminal 301, a neutral terminal 302 and a negative terminal 303, a processor 306, a control module 305 and a power conversion stage 304. The positive terminal 301, the neutral terminal 302 and the negative terminal 303 are referred to as the front-end of the unbalanced voltage converter. The unbalanced voltage converter is connectable to an input device 115, interfaced by means of two or more electrical conductors 309. The unbalanced voltage converter is connectable via the positive terminal 301, neutral terminal 302 and negative terminal 303 to the positive conductor 102, neutral conductor 103 and negative conductor 104 of a bipolar DC system respectively. The power conversion stage 304 contains power semiconductor devices, gate drive circuits and input and output filters for DC/AC or DC/DC conversion. The input device 115 can be an AC grid, another DC grid, an AC end-use device or a DC end-use device. The input device 115 is connectable to the power conversion stage 304 via two or more electrical conductors 309.

The power conversion stage 304 is configured to transfer power from the positive pole to the negative pole, or from the input device 115 to the positive pole or from the input device 115 to the negative pole of the bipolar DC system. The direction of power transfer can be bidirectional, but not necessarily.

Figure 6A:
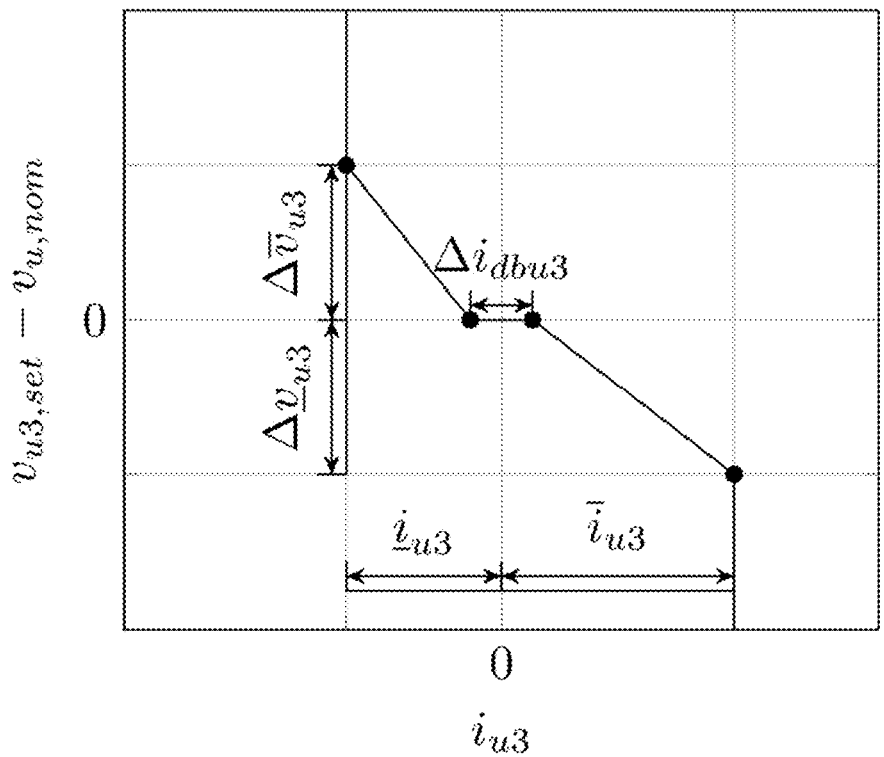
FIGS. 6a to 6c are plots of example relationships between a unbalanced voltage setpoint $v_{u3,set}$ relative to the nominal unbalanced voltage $v_{u,nom}$ of a balanced voltage converter and the output unbalanced current $i_{u3}$.
Figure 6B:
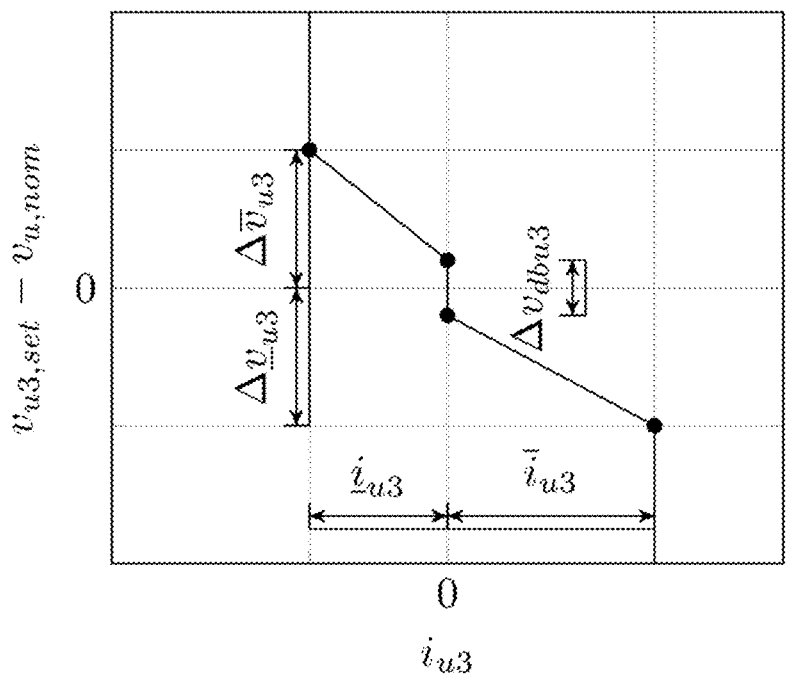
Figure 6C:
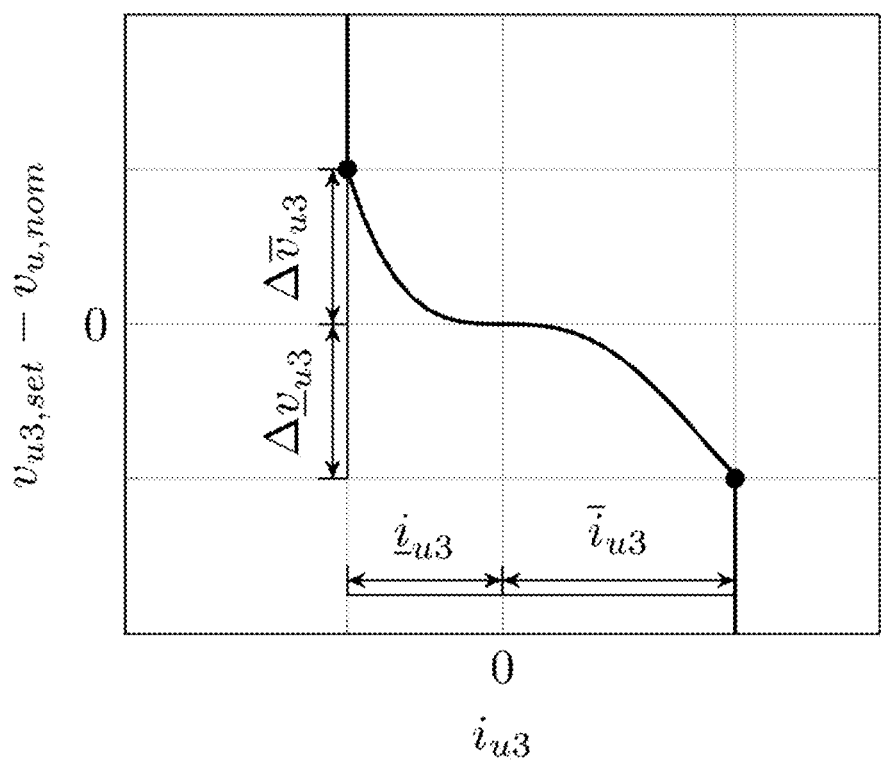

The processor 306 is configured to establish an unbalanced voltage signal $v_{u3}=(v_{p3}-v_{n3})/2$ (with $v_{p3}$ and $v_{n3}$ the positive and the negative pole-to-neutral voltage, respectively—see FIG. 5), an unbalanced current signal $i_{u3}=(i_{p3}-i_{n3})/2$ and an unbalanced voltage setpoint signal $v_{u3,set}$, which is a function of the unbalanced current signal $i_{u3}$. Voltage signal $v_{u3}$ is thus related to the difference of $v_{p3}$ and $v_{n3}$. For example, FIGS. 6a to 6c depict example functional relationships between the unbalanced voltage setpoint signal $v_{u3,set}$, determined by the processor, and the unbalanced current $i_{u3}$. The functional relationships are based on some or all of the following parameters: the nominal unbalanced voltage $v_{u,nom}$, the maximum unbalanced voltage deviation $\Delta \overline{v}_{u3}$, the minimum unbalanced voltage deviation $\Delta \underline{v}_{u3}$, the unbalanced current deadband $\Delta i_{dbu3}$, the unbalanced voltage deadband $\Delta v_{dbu3}$, the maximum unbalanced current $\overline{I}_{u3}$ and the minimum unbalanced current $\underline{i}_{u3}$. The maximum and minimum unbalanced voltage deviation are determined from the voltage tolerances defined for the bipolar DC system. The maximum and minimum unbalanced current is determined by the current limits of the unbalanced voltage converter. The unbalanced current deadband may vary between zero and $\overline{I}_{u3}+\underline{i}_{u3}$. The unbalanced voltage deadband can vary between zero and $\overline{v}_{u3}+\underline{v}_{u3}$. The voltage-current relationship is preferably monotonically decreasing, for example described by a piecewise linear function or a polynomial. In the preceding description, unbalanced power can be used instead of unbalanced current equivalently, in which case the unbalanced power $p_{u3}$ is defined as $p_{u2}=(v_{p3}i_{p3}-v_{n3}i_{n3})/2$.

The control module 305 is configured to receive the unbalanced voltage setpoint signal $v_{u3,set}$ 308 and to send pulse-width modulation signals 307 to the power conversion stage 304, such that the unbalanced voltage signal $v_{u3}$ tracks the unbalanced voltage setpoint signal $v_{u3,set}$. The processor 306 and the control module 305 can be embedded in a single computational unit (not shown).

Positive Voltage Converters

Figure 7:
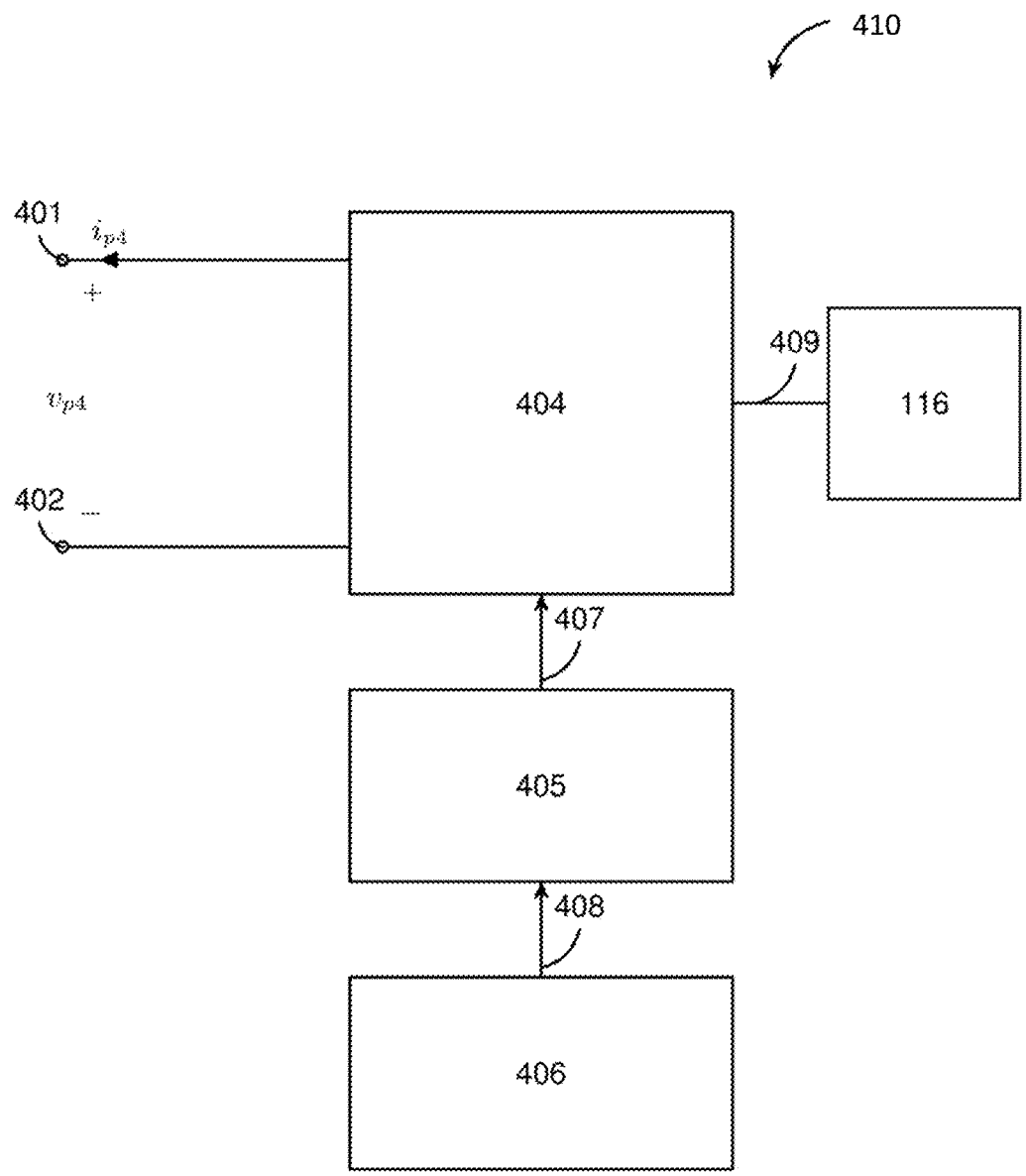
FIG. 7 is a schematic diagram of an internal configuration of a positive voltage converter comprised in embodiments of the present invention.

Referring to FIG. 7, a positive voltage converter 410 comprises a positive terminal 401 and a neutral terminal 402, a processor 406, a control module 405, and a power conversion stage 404. The positive terminal 401 and the neutral terminal 402 are referred to as the front-end of the positive voltage converter. The positive voltage converter is connectable to an input device 116, interfaced by means of two or more electrical conductors 409. The positive voltage converter is connectable via the positive terminal 401 and neutral terminal 402 to the positive conductor 102 and neutral conductor 103 of a bipolar DC system respectively. The power conversion stage 404 contains power semiconductor devices, gate drive circuits and input and output filters for DC/AC or DC/DC conversion. The input device 116 can be an AC grid, another DC grid, an AC end-use device or a DC end-use device. The input device 116 is connectable to the power conversion stage 404 via two or more electrical conductors 409.

Figure 8A:
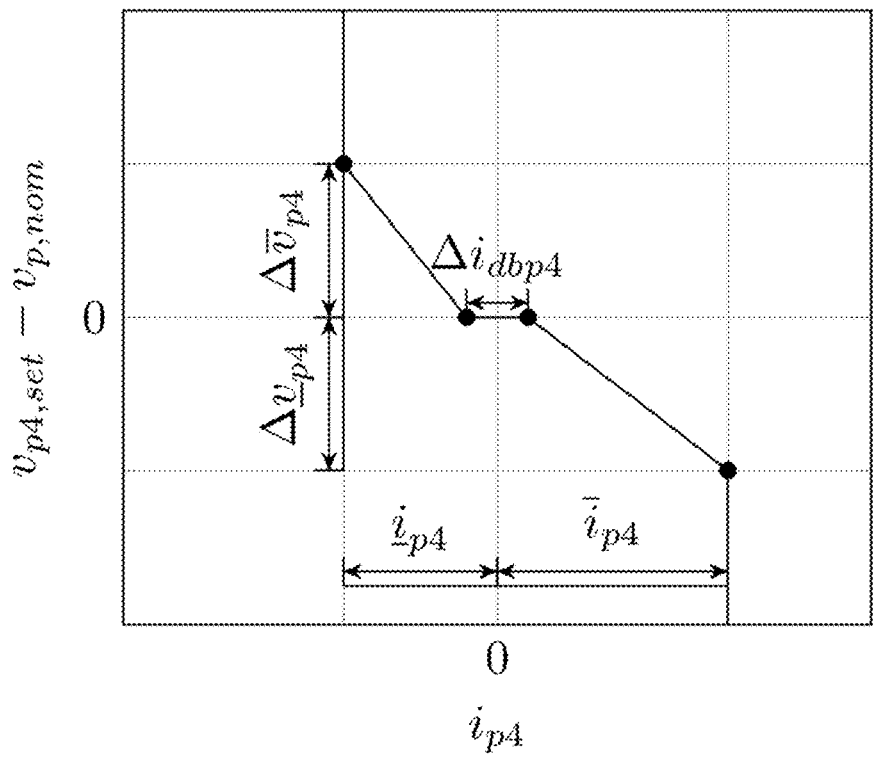
FIGS. 8a to 8c are plots of example relationships between a positive voltage setpoint $v_{p4,set}$ relative to the nominal positive voltage $v_{p,set}$ of a positive voltage converter and the output positive current $i_{p4}$.
Figure 8B:
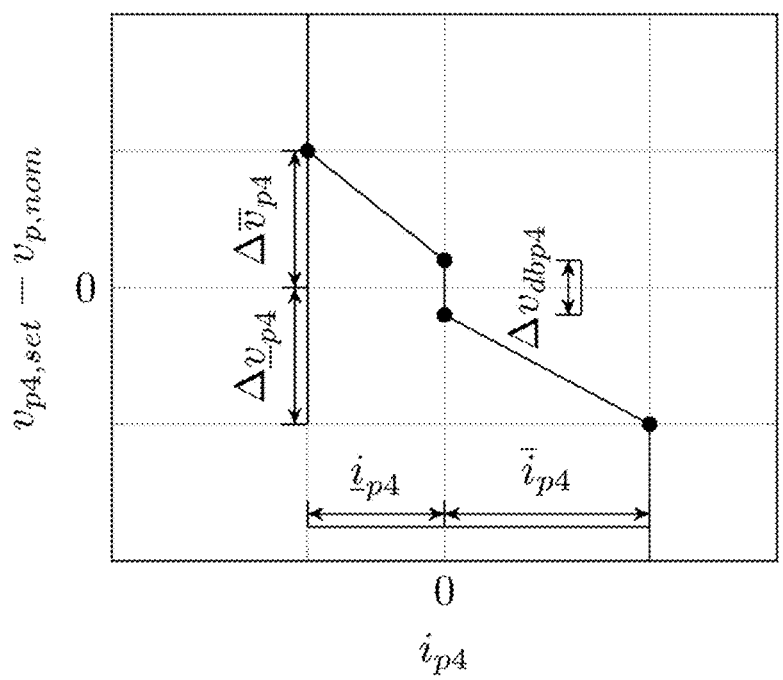
Figure 8C:
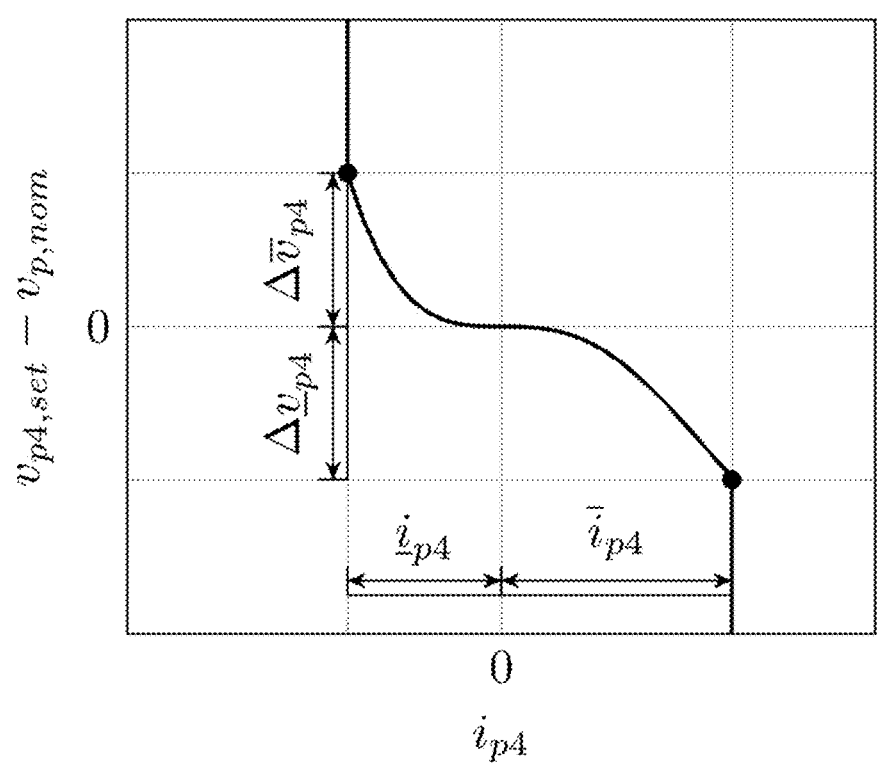

The power conversion stage 404 is configured to transfer power from the input device 116 to the front-end of the positive voltage converter. The direction of power transfer can be bidirectional, but not necessarily. The processor 406 is configured to establish a positive voltage signal $v_{p4}$, a current signal $i_{p4}$ and a positive voltage setpoint signal $v_{p4,set}$, which is a function of the current signal $i_{p4}$. For example, FIGS. 8a to 8c depict example functional relationships between the positive voltage setpoint signal $v_{p4,set}$, determined by the processor, and the positive current $i_p4$. The functional relationships are based on some or all of the following parameters: the nominal positive voltage $v_{p,nom}$, the maximum positive voltage deviation $\Delta\overline{v}_{p4}$, the minimum positive voltage deviation $\Delta\underline{v}_{p4}$, the positive current deadband $\Delta i_{dbp4}$, the positive voltage deadband $\Delta v_{dbp4}$, the maximum positive current $\overline{I}_{p4}$ and the minimum positive current $\underline{i}_{p4}$. The maximum and minimum positive voltage deviation are determined from the voltage tolerances defined for the bipolar DC system. The maximum and minimum positive current is determined by the current limits of the positive voltage converter. The positive current deadband may vary between zero and $\overline{I}_{p4}+\underline{i}_{p4}$. The positive voltage deadband can vary between zero and $\overline{v}_{p4}+\underline{v}_{p4}$. The voltage-current relationship is preferably monotonically decreasing, for example described by a piecewise linear function or a polynomial. In the preceding description, positive power can be used instead of positive current equivalently, in which case the positive power $p_{p4}$ is defined as $p_{p4}=v_{p4}i_{p4}$.

The control module 405 is configured to receive the positive voltage setpoint signal $v_{p4,set}$ 408 and to send pulse-width modulation signals 407 to the power conversion stage 404, such that the voltage signal $v_{p4}$ tracks the voltage setpoint signal $v_{p4,set}$. The processor 406 and the control module 405 can be embedded in a single computational unit (not shown).

Negative Voltage Converters

Figure 9:
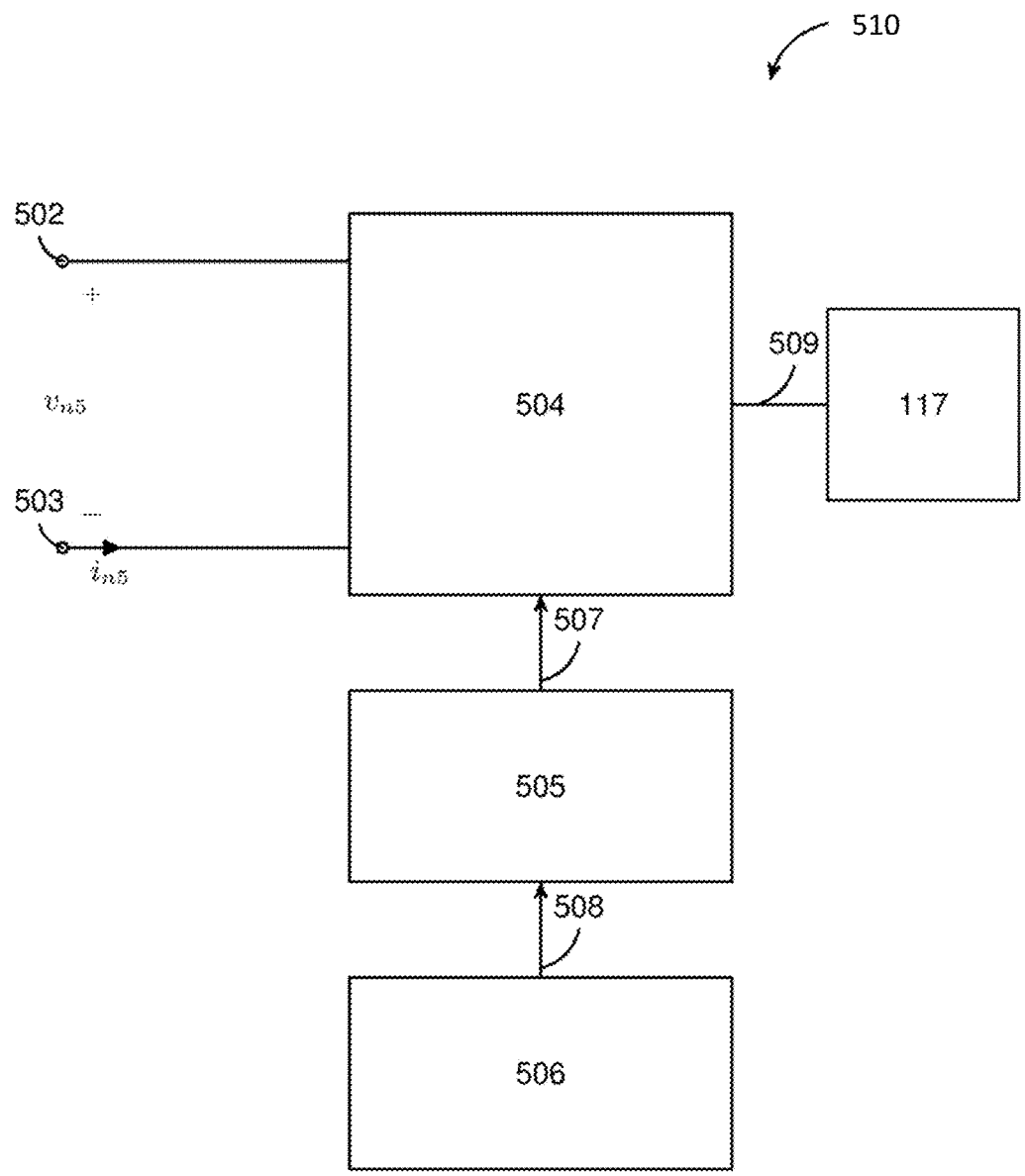
FIG. 9 is a schematic diagram of an internal configuration of a negative voltage converter comprised in embodiments of the present invention.

Referring to FIG. 9, a negative voltage converter 510 comprises a neutral terminal 502 and a negative terminal 503, a processor 506, a control module 505, and a power conversion stage 504. The neutral terminal 502 and the negative terminal 503 are referred to as the front-end of the negative voltage converter. The negative voltage converter is connectable to an input device 117, interfaced by means of two or more electrical conductors 509. The negative voltage converter is connectable via the neutral 502 and negative 503 terminal to the neutral 103 and negative 104 conductor of a bipolar DC system respectively. The power conversion stage 504 contains power semiconductor devices, gate drive circuits and input and output filters for DC/AC or DC/DC conversion. The input device 117 can be an AC grid, another DC grid, an AC end-use device or a DC end-use device. The input device 117 is connectable to the power conversion stage 504 via two or more electrical conductors 509.

The power conversion stage 504 is configured to transfer power from the input device 117 to the front-end of the negative voltage converter. The direction of power transfer can be bidirectional, but not necessarily.

Figure 10A:
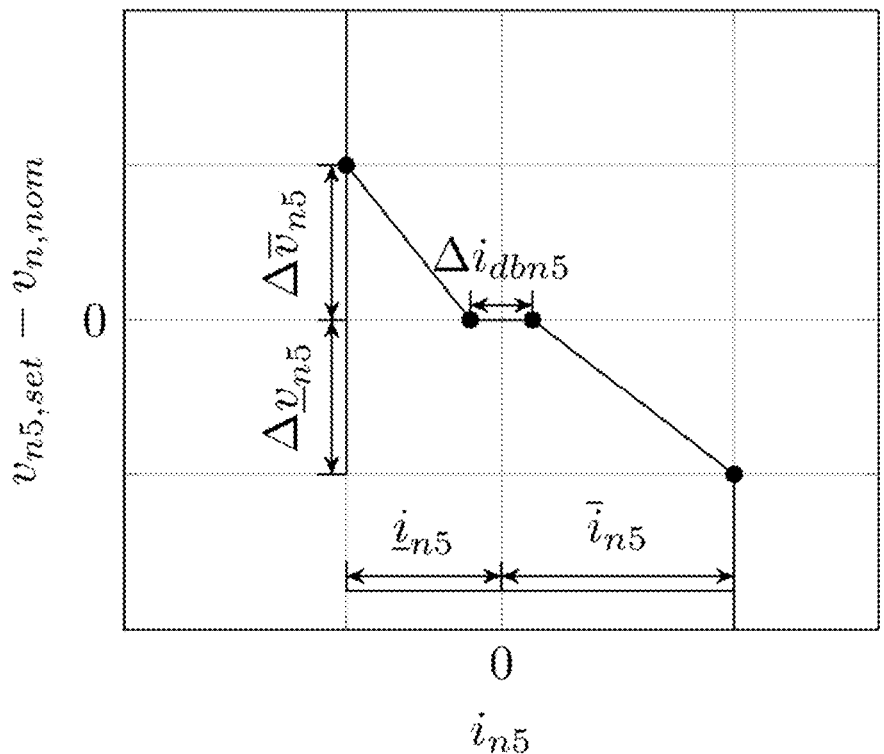
FIGS. 10a to 10c are plots of example relationships between a negative voltage setpoint $v_{n5,set}$ relative to the nominal negative voltage $v_{n,set}$ of a negative voltage converter and the output negative current $i_{n5}$.
Figure 10B:
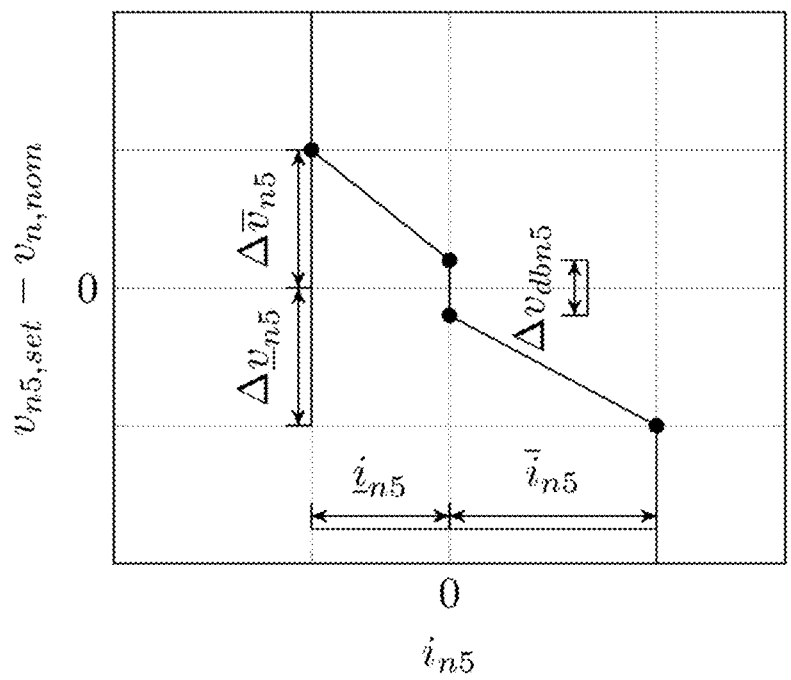
Figure 10C:
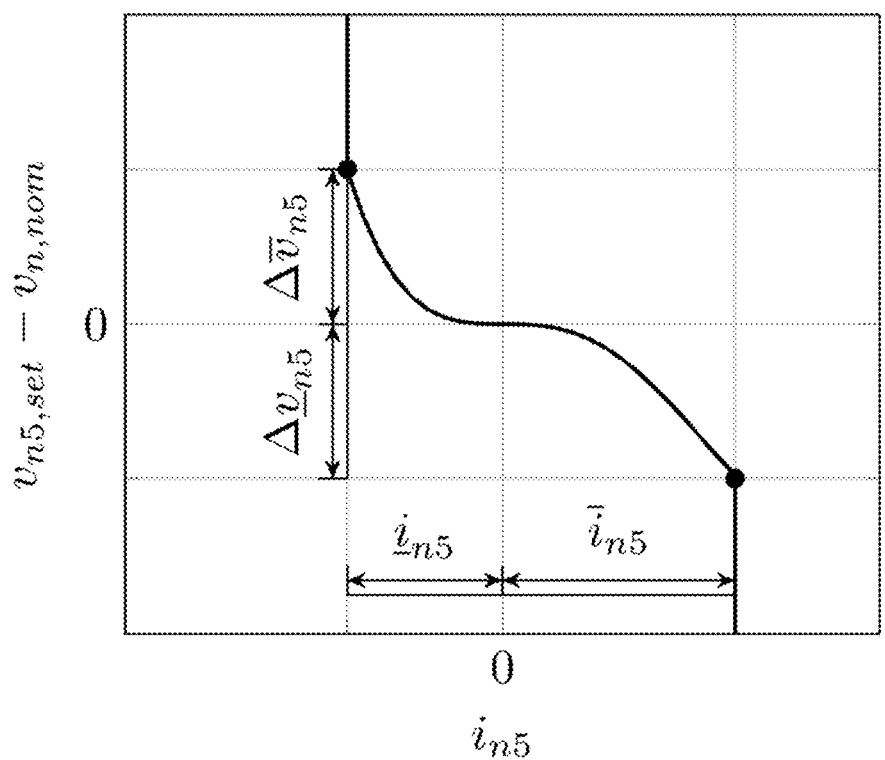

The processor 506 is configured to establish a voltage signal $v_{n5}$, a current signal $i_{n5}$ and a voltage setpoint signal $v_{n5,set}$, which is a function of the current signal $i_{n5}$. For example, FIGS. 10a to 10c depict example functional relationships between the negative voltage setpoint signal $v_{n5,set}$, determined by the processor, and the negative current $i_{n5}$. The functional relationships are based on some or all of the following parameters: the nominal negative voltage $v_{n,nom}$, the maximum negative voltage deviation $\Delta\overline{v}_{n5}$, the minimum negative voltage deviation $\Delta\underline{v}_{n5}$, the negative current deadband $\Delta i_{dbn5}$, the negative voltage deadband $\Delta v_{dbn5}$, the maximum negative current $\overline{I}_{n5}$ and the minimum negative current $\underline{i}_{n5}$. The maximum and minimum negative voltage deviation are determined from the voltage tolerances defined for the bipolar DC system. The maximum and minimum negative current is determined by the current limits of the negative voltage converter. The negative current deadband may vary between zero and $\overline{I}_{n5}+\underline{i}_{n5}$. The negative voltage deadband can vary between zero and $\overline{v}_{n5}+\underline{v}_{n5}$. The voltage-current relationship is preferably monotonically decreasing, for example described by a piecewise linear function or a polynomial. In the preceding description, negative power can be used instead of negative current equivalently, in which case the negative power $p_{n5}$ is defined as $p_{n5}=v_{n5}i_{n5}$.

The control module 505 is configured to receive the voltage setpoint signal $v_{n5,set}$ 508 and to send pulse-width modulation signals 507 to the power conversion stage 504, such that the voltage signal $v_{n5}$ tracks the voltage setpoint signal $v_{n5,set}$. The processor 506 and the control module 505 can be embedded in a single computational unit (not shown).

Further Exemplary Embodiments

Referring to FIGS. 11 to 16, various configurations of the first and second voltage converters are possible within the scope of the present invention.

Figure 11:
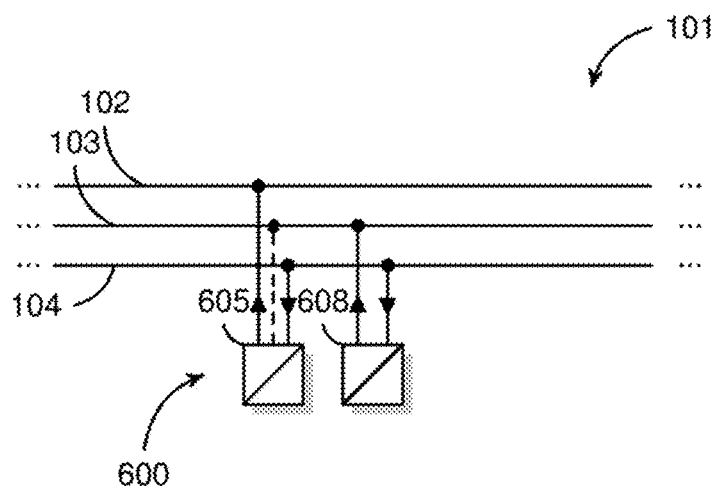
FIG. 11 to FIG. 16 are schematic diagrams of systems according to embodiments of the present invention and a bipolar DC power system.

Referring to FIG. 11, in a system 600 according to embodiments of the present invention, the first voltage converter 605 is a balanced voltage converter and the second voltage converter 608 is a negative voltage converter. Hence, the first voltage converter controls the sum of the positive pole-to-neutral voltage and the negative pole-to-neutral voltage.

Figure 12:
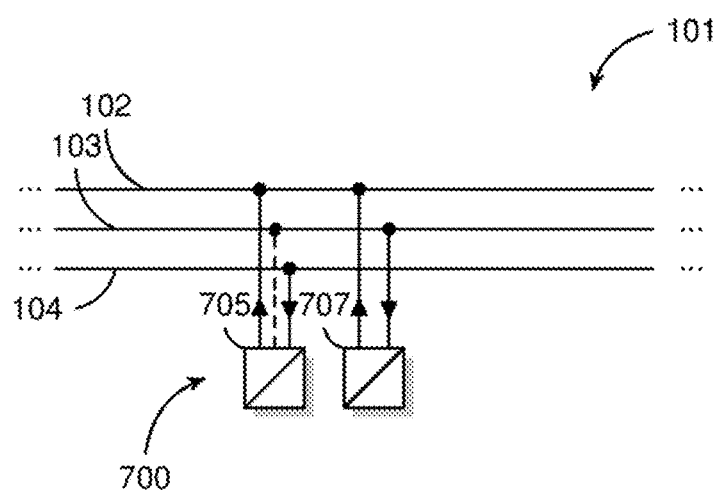

Referring to FIG. 12, in a system 700 according to embodiments of the present invention, the first voltage converter 705 is a balanced voltage converter and the second voltage converter 707 is a positive voltage converter. Again, the first voltage converter controls the sum of the positive pole-to-neutral voltage and the negative pole-to-neutral voltage.

Figure 13:
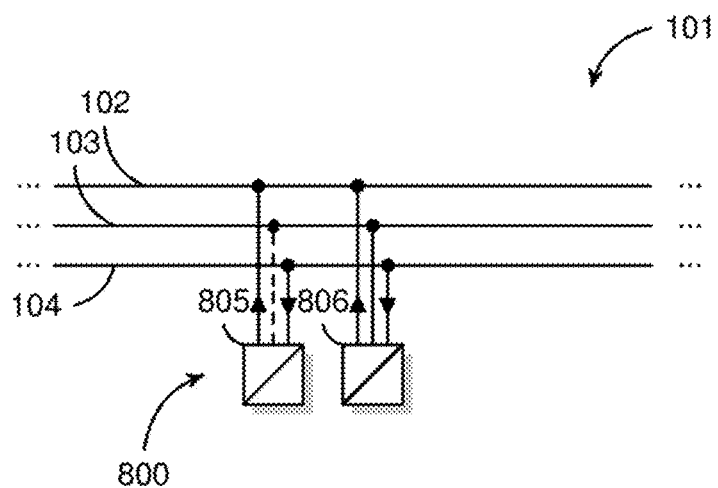

Referring to FIG. 13, in a system 800 according to embodiments of the present invention, the first voltage converter 805 is a balanced voltage converter and the second voltage converter 806 is an unbalanced voltage converter. Again, the first voltage converter controls the sum of the positive pole-to-neutral voltage and the negative pole-to-neutral voltage.

Figure 14:
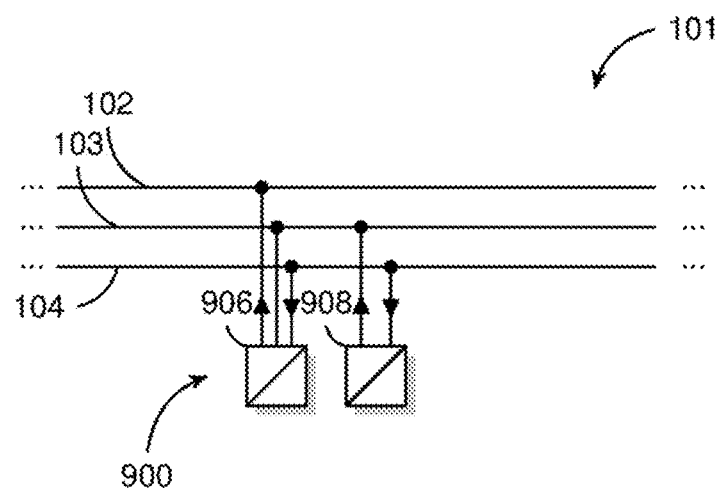

Referring to FIG. 14, in a system 900 according to embodiments of the present invention, the first voltage converter 906 is an unbalanced voltage converter and the second voltage converter 908 is a negative voltage converter. Hence, the first voltage converter here controls the difference of the positive pole-to-neutral voltage and the negative pole-to-neutral voltage.

Figure 15:
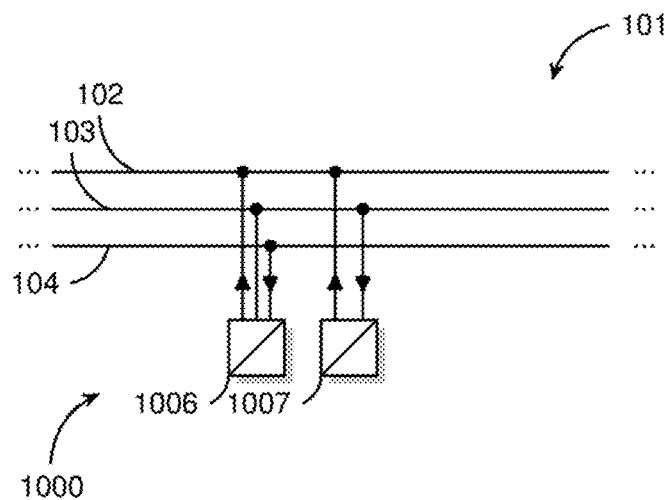

Referring to FIG. 15, in a system 1000 according to embodiments of the present invention, the first voltage converter 1006 is an unbalanced voltage converter and the second voltage converter 1007 is a positive voltage converter. Again, the first voltage converter controls the difference of the positive pole-to-neutral voltage and the negative pole-to-neutral voltage.

Figure 16:
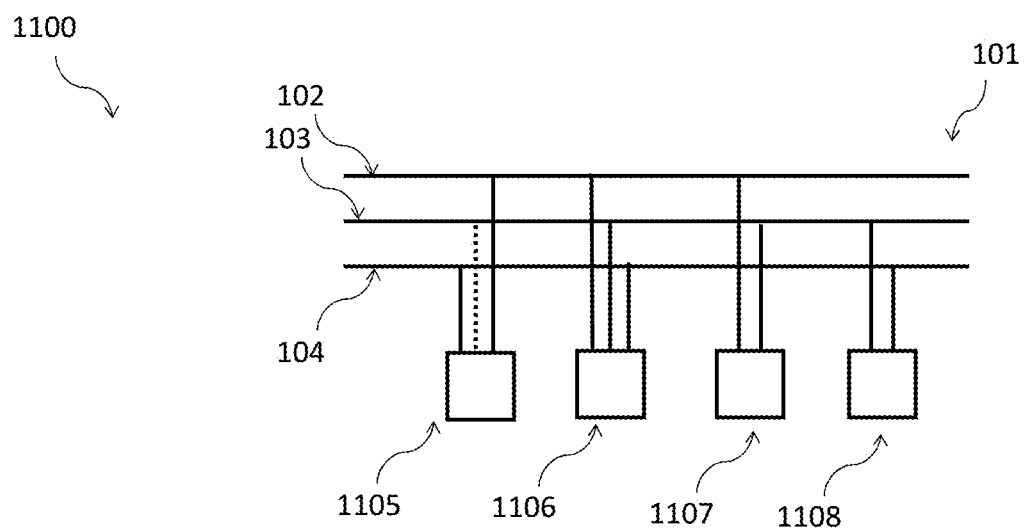

Referring to FIG. 16, in a system 1100 according to embodiments of the present invention, the first voltage converter 1105 is a balanced voltage converter and the second voltage converter 1106 is an unbalanced voltage converter. The first voltage converter controls the sum of the positive pole-to-neutral voltage and the negative pole-to-neutral voltage and the second voltage converter controls the difference of the positive pole-to-neutral voltage and the negative pole-to-neutral voltage. The system 1100 further comprises a positive voltage converter 1107 and a negative voltage converter 1108. A system according to embodiments of the present invention may comprise more than two voltage converters, provided that the system comprises at least a first voltage converter which is a balanced or an unbalanced voltage converter, and a second voltage converter, wherein if the first voltage converter is a balanced voltage converter then the second voltage converter is an unbalanced converter, a positive converter, or a negative converter, and if the first voltage converter is an unbalanced voltage converter then the second voltage converter is a balanced converter, a positive converter, or a negative converter. In a system according to embodiments of the present invention, converters in addition to the first and second voltage converters may be any of balanced, unbalanced, positive, or negative converters.

In some embodiments, the first converter and the second converter may be the same converter. For example, a single converter may contain a single processor, which is configured to determine the balanced and unbalanced voltages and the balanced and unbalanced currents. In this example, the first converter and the second converter are comprised in a single converter.

Control Method

Figure 17:
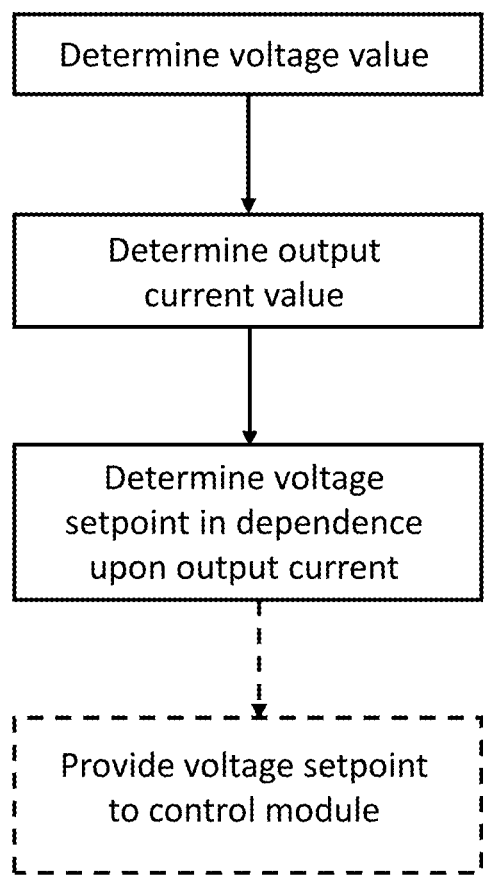
FIG. 17 is a flow chart of a voltage control method according to embodiments of the present invention.

Referring to FIG. 17, a flow chart of a method of controlling the voltage of a system according to embodiments of the present invention is shown. The method comprises the following steps, in a system according to embodiments of the present invention:

Step S1

The voltage value which is to be controlled is determined. The voltage value may be determined based on a direct measurement of the voltage. The voltage value may be derived from a linear combination of direct measurements of the voltage.

Step S2

The output current through the voltage to be controlled is determined. The output current may be determined based on a direct measurement of the current or may be derived from measurements of other quantities of the system, such as measurement of a current or power flowing to an input device.

Step S3

The setpoint of the voltage to be controlled is determined in dependence upon the output current value.

The method optionally comprises step S4 in which the setpoint voltage is provided to the control module of a voltage converter.

The method may be performed by the processors comprised in the respective voltage converters of a system according to embodiments of the present invention.

In embodiments of the present invention, a processor comprised in a voltage converter of a system according to embodiments of the present invention is configured to perform a voltage control method according to embodiments of the present invention.

In embodiments of the present invention, a single-point-of-failure is avoided, for example by equipping DC/AC AC load with the ability to control $v_p$ as a function of the positive current or power. Or alternatively, for example, by extending the system with a second voltage balancer and embedding a controller, controlling $v_p+v_n$ as a function of $i_p+i_n$, into the DC/DC BESS. The presented invention enables both to operate in parallel with the original system.

In embodiments of the present invention, an overlay control scheme relying upon communication is not essential.

Figure 18:
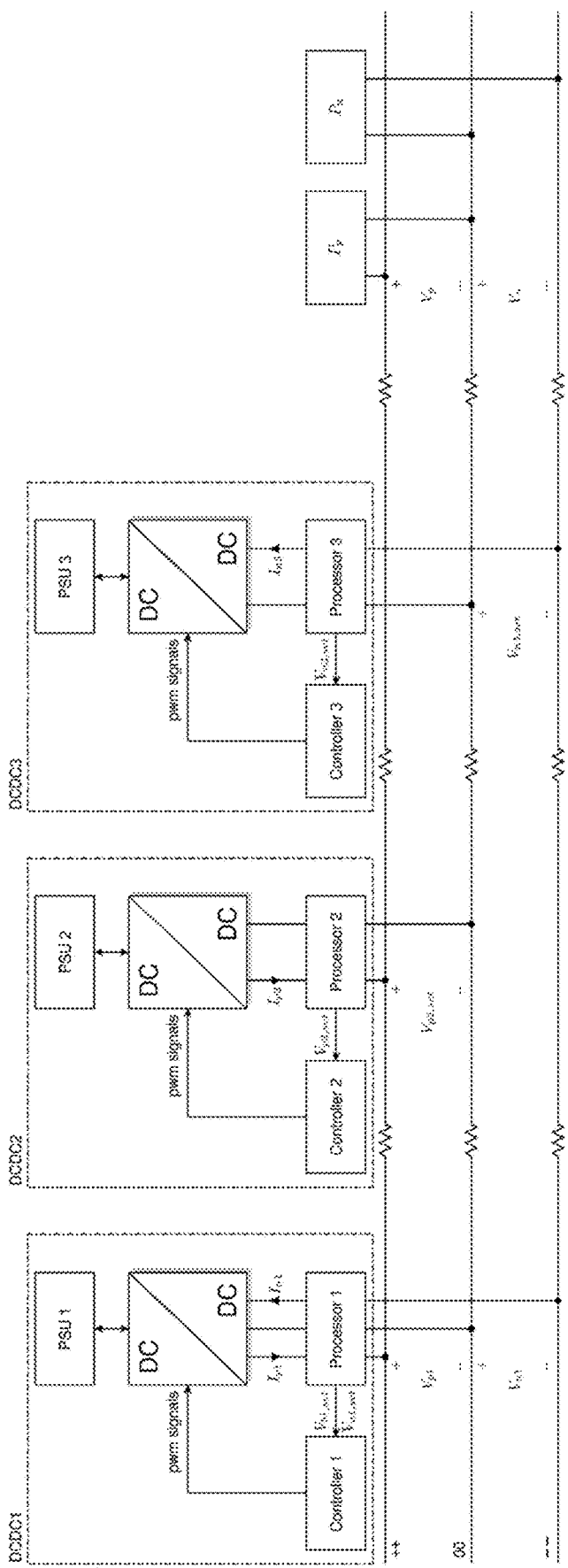
FIG. 18 is a schematic diagram of an experimental set-up for validating the voltage control method according to embodiments of the present invention.
Figure 19:
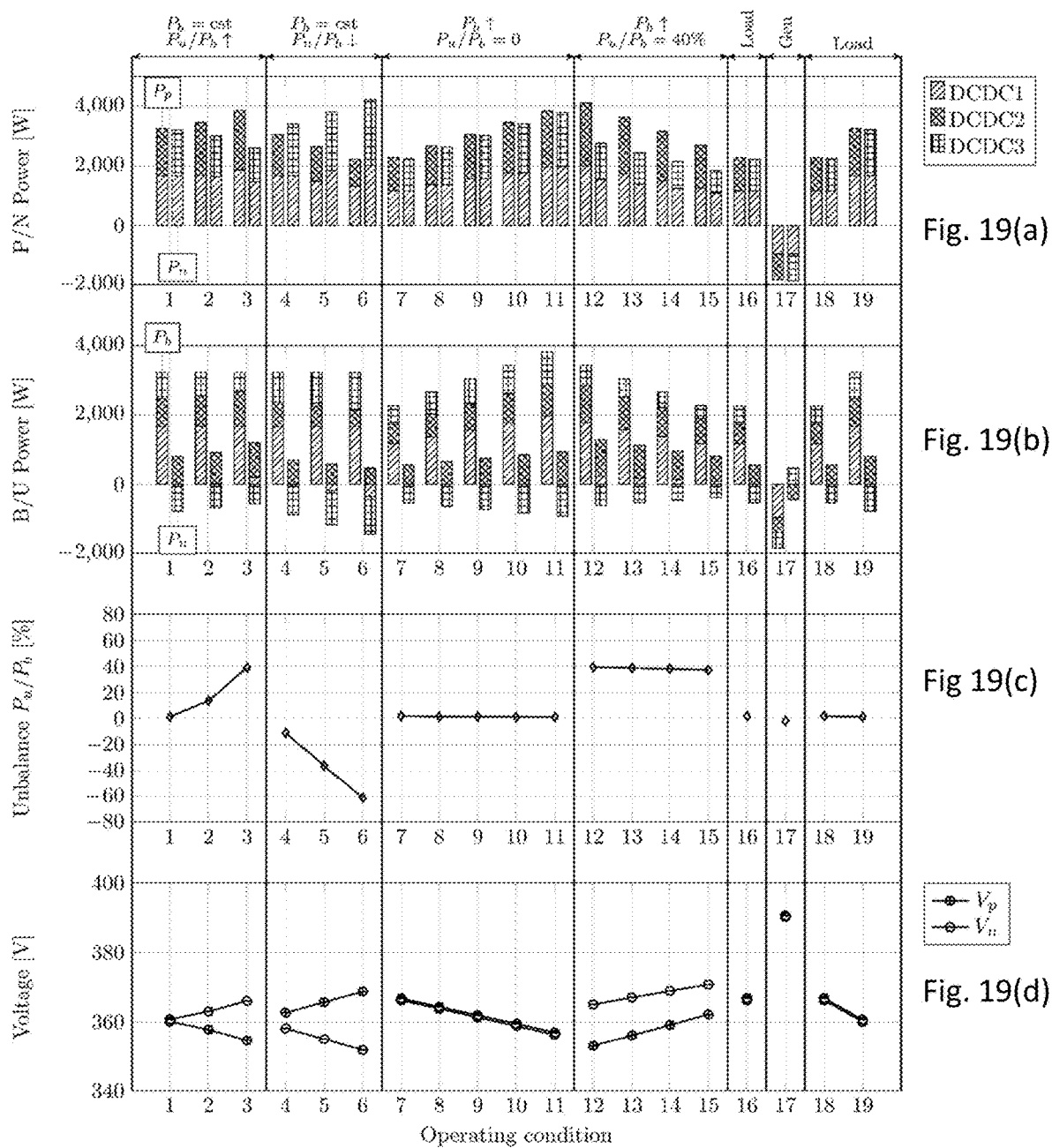
FIG. 19, including

An embodiment of the presented invention has been experimentally validated in the set-up depicted in FIG. 18. The experimental set-up comprises a bipolar DC system comprising three DC-DC voltage converters, referenced to as DCDC1, DCDC2 and DCDC3. DCDC1 is connected to the power supply unit PSU 1 and the positive, neutral and negative conductor of the bipolar DC system. DCDC2 is connected to the power supply unit PSU 2 with the positive and the neutral conductor of the bipolar DC system. DCDC3 is connected to the power supply unit PSU 3 with the neutral and the negative conductor of the bipolar DC system. The test set-up furthermore comprises a positive constant power load $P_p$, connected between the positive conductor and the neutral conductor, and a negative constant power load $P_n$, connected between the neutral conductor and the negative conductor.

Figure 20:
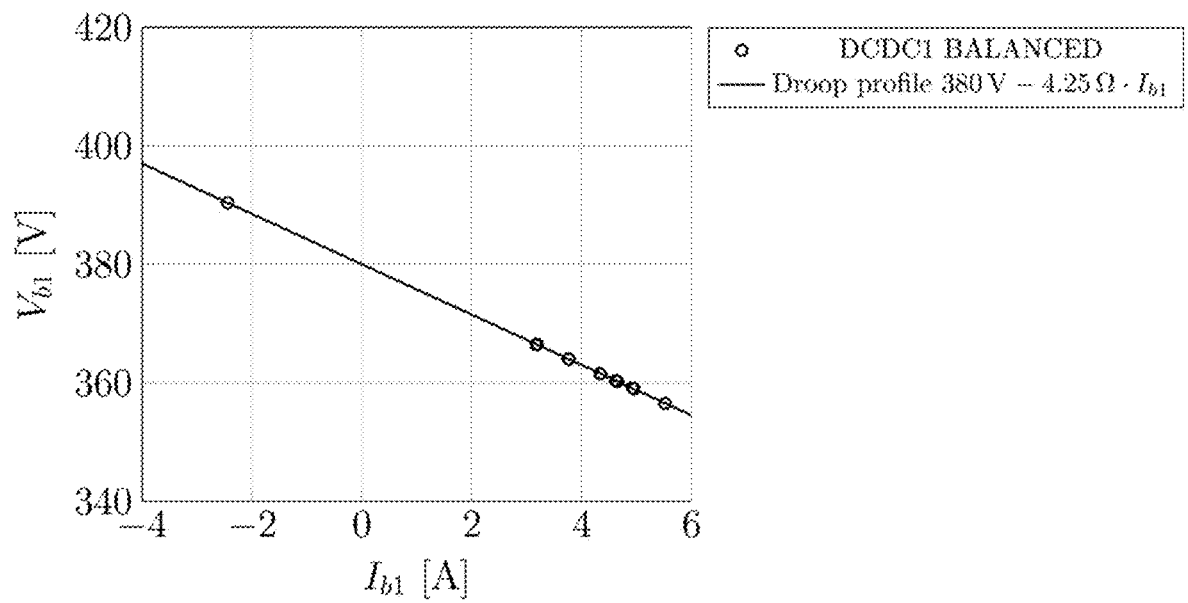
FIG. 20 is a plot of experimentally measured balanced voltage versus balanced output current of DCDC1.
Figure 21:
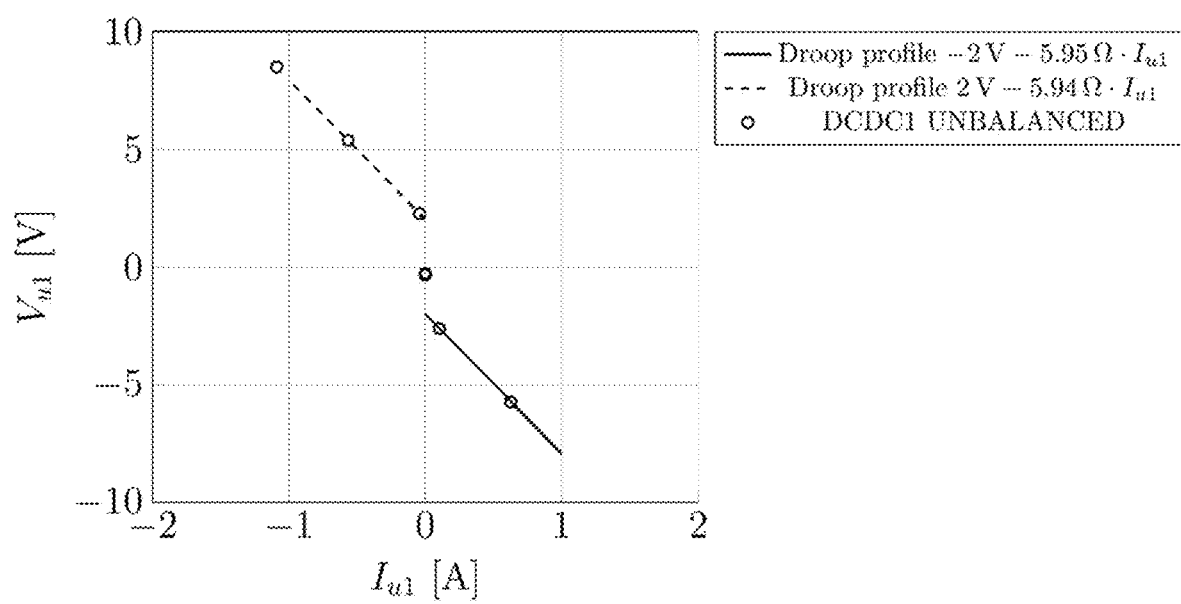
FIG. 21 is a plot of experimentally measured unbalanced voltage versus unbalanced output current of DCDC1.
Figure 22:
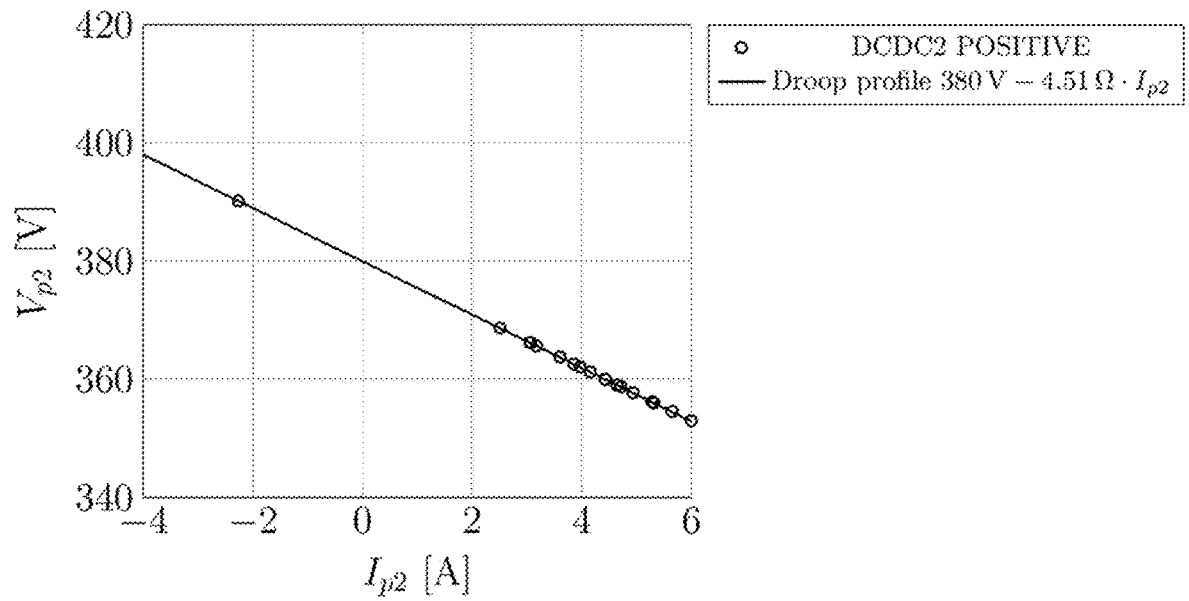
FIG. 22 is a plot of experimentally measured positive pole-to-neutral voltage versus positive output current of DCDC2.
Figure 23:
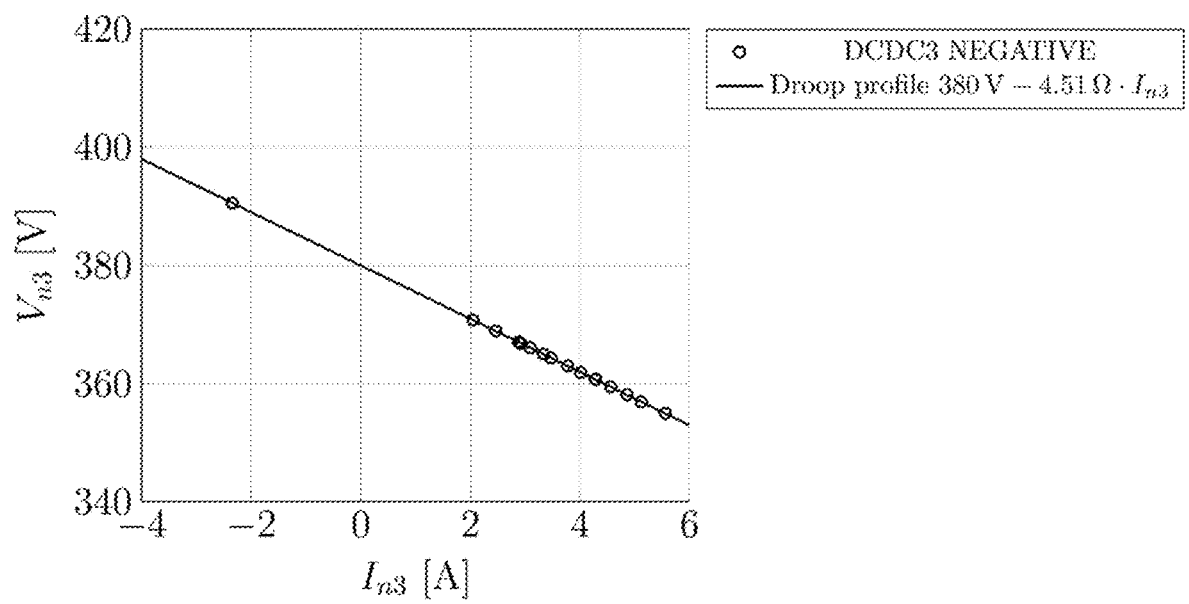
FIG. 23 is a plot of experimentally measured negative pole-to-neutral voltage versus negative output current of DCDC3.

DCDC1, DCDC2 and DCDC3 each contain a control device. The processor of DCDC1 determines the positive pole-to-neutral voltage $V_{p1}$ and the negative pole-to-neutral voltage $V_{n1}$. The controller of DCDC1 controls the balanced voltage $V_{b1}=(V_{p1}+V_{n1})/2$ to a setpoint $V_{b1,set}$ as a function of the balanced current $I_{b1}=(I_{p1}+I_{n1})/2$ according to the droop profile shown in FIG. 20 and the unbalanced voltage $V_{u1}=(V_{p1}-V_{n1})/2$ to a setpoint $V_{u1,set}$ as a function of the unbalanced current $I_{u1}=(I_{p1}-I_{n1})/2$ according to the droop profile shown in FIG. 21. The processor of DCDC2 determines the positive pole-to-neutral voltage $V_{p2}$. The controller of DCDC2 controls the positive pole-to-neutral voltage $V_{p2}$ to a setpoint $V_{p2,set}$ as a function of the positive current $I_{p2}$. The processor of DCDC3 measures the negative pole-to-neutral voltage $V_{n3}$. The controller of DCDC3 controls the negative pole-to-neutral voltage $V_{n3}$ to a setpoint $V_{n3,set}$ as a function of the negative current $I_{n3}$. DCDC1 is thus a balanced voltage converter and unbalanced voltage converter, DCDC2 is a positive voltage converter and DCDC3 is a negative voltage converter. They conjointly control the voltages of the bipolar DC system for varying loading conditions determined by the constant power loads $P_p$ and $P_n$.

The test results are depicted in FIGS. 19 to 23 for balanced and unbalanced loading conditions. The first graph, FIG. 19a, shows the power injected in the positive and the negative pole contributed by the three voltage converters. DCDC2 solely injects power in the positive pole and DCDC3 solely injects power in the negative pole. DCDC1 is able to inject power in both the positive and the negative pole. The second graph, FIG. 19b, depicts the balanced $P_{bx}(P_{px}+P_{nx})/2$ (x=1, 2, 3) and the unbalanced $P_{ux}(P_{px}-P_{nx})/2$ (x=1, 2, 3) power for the three voltage converters. The third graph, FIG. 19c, depicts the unbalanced power ratio $P_u/P_b$ and the fourth graph, wherein $P_b=(P_p+P_n)/2$ and $P_u=(P_p-P_n)/2$, FIG. 19d, depicts the positive pole-to-neutral voltage $V_p$ and the negative pole-to-neutral voltage $V_n$ at the constant power load terminals.

In the first three operating conditions, the total power remains constant, but unbalance is introduced as more power is gradually injected in the positive pole relative to the negative pole. The power in the positive pole increases with a particular amount and the power in the negative pole decreases with that same amount so that the total power remains constant. In operating condition 4 to 6, the unbalance shifts to the negative pole and more power is gradually withdrawn from the negative pole relative to the positive pole. In all operating scenarios, the processors of the voltage converters calculate voltage setpoints as a function of their respective current.

The programmed voltage as a function of the current for voltage converters DCDC1, DCDC2 and DCDC3 is depicted in FIG. 20-23. The figures clearly show that the voltage converters adjust the voltage as a function of the current. The nominal balanced, positive and negative pole-to-neutral voltage are set at 380V at zero current. The nominal unbalanced voltage is set at 0V at zero current. The slope of the linear functional relationship between the voltage and the current is set at −4.25 V/A, −5.94 V/A, −4.51 V/A and −4.51 V/A for the balanced, unbalanced, positive and negative voltage converter. The unbalanced voltage as a function of current relationship has a deadband of 4V. Measurement of the positive, negative pole-to-neutral voltage, or a linear combination of the positive pole-to-neutral voltage and the negative pole-to-neutral voltage as a function of the positive current, negative current or a linear combination of the positive current and the negative current provides a manner for verifying the applicability of the present invention.

The invention claimed is:

1. A system for controlling a bipolar DC power system, the bipolar DC power system comprising a positive conductor, a neutral conductor and negative conductor,
   wherein a positive pole-to-neutral voltage is a voltage between the positive conductor and the neutral conductor, and a negative pole-to-neutral voltage is a voltage between the negative conductor and the neutral conductor,
   wherein the system comprises control means for controlling the positive pole-to-neutral voltage and the negative pole-to-neutral voltage, the control means comprising:
   a first voltage converter configured to control a sum or difference of the positive pole-to-neutral voltage and the negative pole-to-neutral voltage; and
   a second voltage converter, wherein, if the first voltage converter is configured to control the sum of the positive pole-to-neutral voltage and the negative pole-to-neutral voltage, then the second voltage converter is configured to control the positive pole-to-neutral voltage, the negative pole-to-neutral voltage, or the difference of the positive pole-to-neutral voltage and the negative pole-to-neutral voltage, and
   wherein if the first voltage converter is configured to control the difference of the positive pole-to-neutral voltage and the negative pole-to-neutral voltage, then the second voltage converter is configured to control the positive pole-to-neutral voltage, the negative pole-to-neutral voltage, or the sum of the positive pole-to-neutral voltage and the negative pole-to-neutral voltage,
   wherein controlling a voltage comprises controlling the voltage as a function of a respective output current or power by determining per converter a setpoint voltage in dependence upon the respective output current or power value, and by maintaining per converter the respective voltage at the setpoint value of the converter.

2. The system according to claim 1, wherein one or more of the voltage converters of the control means is configured for controlling the positive pole-to-neutral voltage and the negative pole-to-neutral voltage.

3. The system according to claim 1, further comprising one or more additional voltage converters, each converter being configured to control the sum or difference of the positive pole-to-neutral voltage and the negative pole-to-neutral voltage, the positive pole-to-neutral voltage, or the negative pole-to-neutral voltage,
   wherein controlling a voltage comprises controlling the voltage as a function of the respective output current or power.

4. The system according to claim 1, wherein a converter configured to control the sum of the positive pole-to-neutral voltage and the negative pole-to-neutral voltage comprises a positive terminal coupled to the positive conductor, and a negative terminal coupled to the negative conductor.

5. The system according to claim 1, wherein a converter configured to control the difference of the positive pole-to-neutral voltage and the negative pole-to-neutral voltage comprises a positive terminal coupled to the positive conductor, a neutral terminal coupled to the neutral conductor and a negative terminal coupled to the negative conductor.

6. The system according to claim 1, in which a converter configured to control the sum of the positive pole-to-neutral voltage and the negative pole-to-neutral voltage comprises a processor configured to determine individually or in linear combination a positive pole-to-neutral voltage, a negative pole-to-neutral voltage, a positive output current and a negative output current.

7. The system according to claim 1, in which a converter configured to control the difference of the positive pole-to-neutral voltage and the negative pole-to-neutral voltage comprises a processor configured to determine individually or in linear combination a positive pole-to-neutral voltage, a negative pole-to-neutral voltage, a positive output current and a negative output current.

8. The system according to claim 1, in which a converter configured to control the positive pole-to-neutral voltage comprises a processor configured to determine the positive pole-to-neutral voltage and the positive output current.

9. The system according to claim 1, in which a converter configured to control the negative pole-to-neutral voltage comprises a processor configured to determine the negative pole-to-neutral voltage and the negative output current.

10. The system according to claim 1, in which the first voltage converter and the second voltage converter are integrated in a single device.

11. A method of controlling a voltage in a bipolar DC power system comprising a positive conductor, a neutral conductor and negative conductor,
   wherein a positive pole-to-neutral voltage is a voltage between the positive conductor and the neutral conductor, and a negative pole-to-neutral voltage is a voltage between the negative conductor and the neutral conductor, using a system for controlling the bipolar DC power system,
   wherein the system for controlling comprises a first voltage converter configured to control a sum or difference of the positive pole-to-neutral voltage and the negative pole-to-neutral voltage; and
   a second voltage converter, wherein, if the first voltage converter is configured to control the sum of the positive pole-to-neutral voltage and the negative pole-to-neutral voltage, then the second voltage converter is configured to control the positive pole-to-neutral voltage, the negative pole-to-neutral voltage, or the difference of the positive pole-to-neutral voltage and the negative pole-to-neutral voltage, and
   wherein if the first voltage converter is configured to control the difference of the positive pole-to-neutral voltage and the negative pole-to-neutral voltage, then the second voltage converter is configured to control the positive pole-to-neutral voltage, the negative pole-to-neutral voltage, or the sum of the positive pole-to-neutral voltage and the negative pole-to-neutral voltage,
   wherein controlling a voltage comprises controlling the voltage as a function of the respective output current or power,
   the method comprising per converter:
   receiving a voltage value in the system for controlling;
   receiving an output current or power value in the system for controlling;
   determining a setpoint voltage in dependence upon the output current or power value; and
   maintaining the voltage value at the setpoint voltage.

12. The method according to claim 11, further comprising providing the setpoint voltage to a control module sending switching signals to a power conversion stage in order to control the voltage value at the setpoint voltage.

* * * * *